United States Patent
Boehm et al.

(10) Patent No.: US 6,461,751 B1
(45) Date of Patent: Oct. 8, 2002

(54) METHOD AND APPARATUS FOR OPERATING A FUEL CELL

(75) Inventors: Gustav Boehm, Ueberlingen (DE); David P. Wilkinson, North Vancouver; Shanna Knights, Burnaby, both of (CA); Reinhold Schamm, Stetten (DE); Nicholas J. Fletcher, Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/455,033

(22) Filed: Dec. 6, 1999

(51) Int. Cl.$^7$ ................................................. H01M 8/04
(52) U.S. Cl. ............................. 429/13; 429/22; 429/23
(58) Field of Search ............................. 429/13, 22, 23, 429/30

(56) References Cited

U.S. PATENT DOCUMENTS

| | | | |
|---|---|---|---|
| 3,268,364 A | 8/1966 | Cade et al. | |
| 3,753,780 A | 8/1973 | Fetterman | |
| 4,202,933 A | 5/1980 | Reiser et al. | 429/13 |
| 4,689,133 A | 8/1987 | McIhenny | 204/269 |
| 4,787,964 A | * 11/1988 | Gordon et al. | 429/40 X |
| 4,859,545 A | 8/1989 | Scheffler et al. | 429/17 |
| 5,366,821 A | 11/1994 | Merritt et al. | 429/21 |
| 5,401,589 A | 3/1995 | Palmer et al. | 429/13 |
| 5,432,020 A | 7/1995 | Fleck | 429/13 |
| 5,434,016 A | 7/1995 | Benz et al. | 429/13 |
| 5,645,950 A | 7/1997 | Benz et al. | 429/13 |
| 5,771,476 A | 6/1998 | Mufford et al. | 429/19 |
| 5,780,981 A | 7/1998 | Sonntag et al. | 318/139 |
| 5,991,670 A | 11/1999 | Mufford et al. | 701/22 |

FOREIGN PATENT DOCUMENTS

| | | |
|---|---|---|
| EP | 0 827 226 A2 | 3/1998 |
| JP | 60-208059 | 10/1985 |
| JP | 60-212966 | 10/1985 |
| JP | 61-279071 | 12/1986 |
| JP | 64-089155 | 4/1989 |
| JP | 01-239772 | 9/1989 |
| JP | 06-223850 | 12/1994 |
| JP | 07-022047 | 1/1995 |
| JP | 8-287931 A | * 1/1996 |
| JP | 9-27336 A | * 1/1997 |
| WO | WO 97/44844 | 11/1997 |
| WO | WO 98/15022 | 4/1998 |
| WO | WO 00/02282 | 1/2000 |

OTHER PUBLICATIONS

Geankoplis, Christie J. Transport Processes and Unit Operations, $3^{rd}$ ed., Prentice Hall, 1993 (no month), pp. 138–140.*

* cited by examiner

*Primary Examiner*—Patrick Ryan
*Assistant Examiner*—Jonathan Crepeau
(74) *Attorney, Agent, or Firm*—McAndrews, Held & Malloy, Ltd.

(57) ABSTRACT

The present invention relates to improving the overall efficiency of a fuel cell system by reducing parasitic power consumption. A controller is programmed to decrease oxidant stoichiometry until oxidant starvation is detected or until oxidant stoichiometry is about one. When oxidant starvation is detected, the oxidant stoichiometry is increased until oxidant starvation is no longer detected. The fuel cell system employs a sensor for detecting an operational characteristic such as voltage output, or oxygen or hydrogen concentration in the cathode exhaust stream. The controller uses the operational characteristic to calculate oxidant stoichiometry or to determine when there is oxidant starvation at the cathode.

29 Claims, 15 Drawing Sheets

METHOD AND APPARATUS FOR OPERATING A FUEL CELL

FIELD OF THE INVENTION

The present invention relates to a method and apparatus for operating a fuel cell that improves the overall efficiency of the fuel cell system. In particular, efficiency is improved by controlling the supply of oxidant so as to reduce excess oxidant flow.

BACKGROUND OF THE INVENTION

Electrochemical fuel cells convert reactants, namely, fuel and oxidant fluid streams, to generate electric power and reaction products. Electrochemical fuel cells generally employ an electrolyte disposed between two electrodes, namely a cathode and an anode. The electrodes each comprise an electrocatalyst disposed at the interface between the electrolyte and the electrodes to induce the desired electrochemical reactions.

The fuel fluid stream, which is supplied to the anode, typically comprises hydrogen and may be pure gaseous hydrogen or a dilute hydrogen stream such as a reformate stream. Alternatively, other fuels such as methanol or dimethyl ether may be supplied to the anode where such fuels may be directly oxidized. The oxidant fluid stream, which is supplied to the cathode, typically comprises oxygen, and may be pure gaseous oxygen, or a dilute oxygen stream such as air.

For a fuel cell, reactant stoichiometry is defined herein as the ratio of the reactant supplied over the reactant theoretically required to produce the current produced by the fuel cell. For conventionally operated fuel cells which typically supply a surplus of oxidant to the cathode, since the oxidant is preferentially reduced at the cathode, oxidant stoichiometry is commonly expressed as the ratio of the oxidant supplied over the oxidant consumed. However, at lower stoichiometries, the reduction of oxidant may not be responsible for all of the current produced by the fuel cell. Other reactions, such as, for example, the reduction of protons may also occur at the cathode and contribute to the current output (i.e. with the consequence of reduced output voltage). In this example, while oxidant may still be the main component being reduced at the cathode, the amount of oxidant theoretically required to produce the current output may be higher than the amount of oxidant actually supplied. Therefore, when components other than the oxidant are reduced at the cathode, oxidant stoichiometries less than one may be sustained. If the oxidant is a dilute oxidant stream such as air, only the reactant component, namely oxygen, is considered in the calculation of stoichiometry (that is, oxidant stoichiometry is the ratio of the amount of oxygen supplied over the theoretical amount of oxygen required to produce the fuel cell output current).

Hydrogen and oxygen are reactive in the fuel cell and are particularly reactive with each other. Accordingly, in solid polymer fuel cells, an important function of the membrane electrolyte is to keep the hydrogen supplied to the anode separated from the oxygen supplied to the cathode. In addition, the membrane is proton conductive and functions as an electrolyte.

The overall efficiency of a fuel cell system is a function of the total power output of the fuel cell(s) and the parasitic power consumption. Total parasitic power consumption is defined herein as the sum of all power that is consumed by the fuel cell system in the course of generating electrical power. The net electrical power output is the total power output minus the total parasitic power consumption. Therefore, overall efficiency may be improved by reducing the parasitic power consumption.

One source of parasitic power consumption, for example, is the oxidant delivery subsystem that typically employs a mechanical device such as a compressor, fan, pump, rotary piston blower, or an equivalent mechanical device that consumes power to supply oxidant to the fuel cell. Higher oxidant stoichiometries generally result in higher parasitic power consumption because more power is generally required to deliver more oxidant to the cathode. Conventional fuel cell systems typically operate with an oxidant stoichiometry greater than two (2.0). Since conventional fuel cell systems direct at least twice the amount of oxygen to the cathode than is actually required to satisfy the electrical power demand, a significant amount of the parasitic power consumption is for directing surplus oxygen to the cathode. Further, fuel cell systems commonly employ a dilute oxidant stream. A dilute oxidant stream is defined herein as a fluid stream that comprises less than 100% oxidant. For example, air is a dilute oxidant stream that typically comprises about 20% oxygen, in addition to other components such as nitrogen. Accordingly, when air is employed as the dilute oxidant stream, parasitic power consumption is amplified because in addition to the surplus oxygen, the oxidant delivery subsystem must also supply a proportionate amount of the other non-reactive components.

One reason why the parasitic power consumption associated with high oxidant stoichiometries is tolerated, is that excess oxidant is desired at the cathode to avoid oxidant starvation at the cathode electrocatalyst. Oxidant starvation is defined herein as the status when oxidant stoichiometry is less than one. Oxygen starvation typically results in a condition, in the absence of oxidant at the cathode electrocatalyst, favoring the production of molecular hydrogen from protons and electrons at the cathode. In severe cases of oxidant starvation the fuel cell may generate a negative voltage and this condition is known as cell reversal. Oxidant stream delivery systems are typically designed to provide a generous surplus of oxidant to maintain performance, to reduce the likelihood of oxidant starvation, and to reduce the likelihood of hydrogen production at the cathode, even though this results in the aforementioned amplified parasitic power consumption.

In fuel cells, oxidant starvation is most likely to occur in regions furthest downstream from the cathode inlet where the oxidant stream enters the cell, for example, near the cathode outlet. An oxidant stoichiometry that provides a surplus of oxidant to the fuel cell provides an adequate concentration of oxidant to the electrocatalyst throughout the electrochemically active area of the cathode, including near the cathode outlet.

Another reason why conventional fuel cell systems seek to avoid low oxidant stoichiometries is that the temperature within the fuel cell may rapidly increase when oxidant stoichiometry is too low. It is generally desirable to maintain the temperature of solid polymer fuel cells below 100° C. When the temperature increases within the fuel cell, parasitic power consumption increases because of the higher load on the cooling system, offsetting, to some degree, the reduction in parasitic power consumption associated with operating at a lower oxidant stoichiometry.

Another disadvantage of operating a fuel cell system with a high oxidant stoichiometry is that higher oxidant stoichiometries generally require higher speeds for the mechanical devices used by the oxidant delivery subsystem to supply the oxidant stream to the cathode. Now that fuel cell systems are being developed for commercial use, mechanical considerations over the planned lifetime of commercial fuel cell systems are a factor. A mechanical disadvantage of conventional high stoichiometry methods of operation is that such methods may result in increased wear and more frequent maintenance. If the oxidant is air, there may be additional operational costs because supplying a high surplus of oxidant also results in higher flow rates that may increase air filter maintenance and/or reduce filter efficiency.

SUMMARY OF THE INVENTION

A method of operating a fuel cell system controls oxidant stoichiometry to reduce parasitic power consumption to improve overall efficiency, while avoiding low oxidant stoichiometries that might cause reduced performance, cell reversal, hydrogen production at the cathode, and increased heat generation within the fuel cell. The fuel cell system comprises a fuel cell power generating subsystem having at least one fuel cell, and an oxidant delivery subsystem that comprises at least one mechanical device for supplying an oxidant stream to a cathode of the fuel cell. The fuel cell also has an anode supplied with a fuel stream. In a preferred embodiment, the fuel cell is a solid polymer fuel cell.

The method comprises controlling the mechanical device, to reduce parasitic power consumption by reducing the oxidant stoichiometry until $dV/d(OS)$ is greater than a predetermined value ("PV"), where $dV$ is the change in cell voltage and $d(OS)$ is the change in oxidant stoichiometry (that is, the slope of a plot of voltage as a function of oxidant stoichiometry). Cell voltage is measured in volts and oxidant stoichiometry is a unit-less ratio.

To practice the invention, the value of $dV/d(OS)$ need not actually be calculated if a relationship between $dV/d(OS)$ and another operational characteristic is known. For example, in preferred embodiments, an operational characteristic that correlates to $dV/d(OS)$ and/or oxidant stoichiometry may be monitored. The fuel cell system is controlled to take action when the value of the monitored operational characteristic correlates to when $dV/d(OS)$ is equal to or greater than PV. For example, in a typical fuel cell system, during normal operation, current density is kept constant and when oxidant stoichiometry is being reduced, a particular cell voltage correlates to when $dV/d(OS)$ increases to PV. That is, when cell voltage decreases below a threshold voltage, this is determined when $dV/d(OS)$ is higher than PV. Accordingly, a fuel cell system may be operated to reduce parasitic power consumption by controlling the oxidant delivery subsystem to maintain voltage output within a predetermined voltage range which typically corresponds to an oxidant stoichiometry range between about one and two, wherein PV is selected so that $dV/d(OS)$ equals PV at the lower limit of the selected voltage range. The preferred range for oxidant stoichiometry may actually change according to the instantaneous operating conditions. For example, when a fuel cell is operating in an idle or low output condition, a higher oxidant stoichiometry may be preferred to prevent accumulation of water at the cathode. Accordingly, the value of PV may be dynamic.

The characteristics of the fuel cell and/or the type of reactants may also influence the preferred oxidant stoichiometry range. For example, in a direct methanol fuel cell, higher stoichiometries are typically employed, but the reactant supply may still be controlled to prevent $dV/d(OS)$ from increasing to higher than PV (although for a direct methanol fuel cell, PV will correspond to a higher stoichiometry, compared to a fuel cell which is fed hydrogen gas or reformate as the fuel stream).

Similarly, when current density is constant and oxidant stoichiometry is being reduced, a particular oxidant stoichiometry correlates to when $dv/d(OS)$ increases to PV. Accordingly, operational characteristics, such as the oxygen concentration in the cathode exhaust stream, which correlate to oxidant stoichiometry, may be monitored to determine when oxidant stoichiometry is reduced to a value which correlates to when $dV/d(OS)$ increases to greater than or equal to PV. The oxidant concentration in the oxidant supply stream is typically known, but if the oxidant supply stream has a variable oxidant concentration (for example, if an oxidant enrichment system is employed), the method may further comprise monitoring and measuring the oxidant concentration in the oxidant supply stream, in addition to monitoring and measuring the oxidant concentration in the oxidant exhaust stream. Alternatively, oxidant stoichiometry may be determined by monitoring and measuring a different operational characteristic, such as, for example, current output for the fuel cell power generating subsystem, which, in addition to the oxidant concentration in the oxidant exhaust stream may be used to calculate oxidant stoichiometry.

The value of $dV/d(OS)$ generally increases as oxidant stoichiometry and cell voltage both decrease. In one embodiment, PV corresponds to when oxidant starvation is beginning to occur or when oxidant starvation is beginning to cause a decline in performance. In a more preferable embodiment, PV corresponds to when further reductions in oxidant stoichiometry will cause a sharp decline in cell voltage output, for example, when $dV/d(OS)$ is higher than 0.02 volt. Preferably, PV is between 0.3 volt and 7.0 volts, so that the fuel cell system operates mostly when $dV/d(OS)$ is less than PV. The selected value for PV controls the oxidant stoichiometry so that it is kept between about one and two during normal operation and closer to about one or a predetermined target value, preferably between 1 and 1.5, during steady state operation.

In a preferred apparatus for practising the method, the fuel cell is one of a plurality of fuel cells arranged in a stack. When the method is applied to a fuel cell stack, the sensor may monitor the operational characteristic for one or more individual fuel cells and/or for the stack as a whole. The sensor may thus be located to monitor an operational characteristic (for example, oxidant or hydrogen concentration) within a portion of a reactant passage (for example, an internal cathode exhaust passage) that is disposed between the outside end surfaces of the stack end plates.

The oxidant stoichiometry is preferably controlled by controlling the oxidant stream mass flow rate, for example, by controlling the speed of a mechanical device, such as a compressor, a fan, a pump, or a blower. Reducing the speed of the mechanical device generally reduces parasitic power consumption and reduces oxidant stoichiometry. However, alternate methods of controlling oxidant stoichiometry may be employed which also reduce parasitic power consumption. For example, if an oxidant enrichment subsystem is employed, oxidant stoichiometry may be controlled by increasing or decreasing the concentration of oxidant in the oxidant stream supplied to the cathode(s) of the fuel cell power generating subsystem. Another method of controlling oxidant stoichiometry is adjusting the electrical power output of the fuel cell, wherein reducing power output generally increases oxidant stoichiometry.

A preferred method that employs a hydrogen sensor (the "Hydrogen Sensor Method") comprises:

(a) monitoring a cathode exhaust stream downstream of the cathode to detect hydrogen gas concentration; and (b) decreasing oxidant stoichiometry when the hydrogen gas concentration is less than a first threshold concentration.

The Hydrogen Sensor Method may further comprise increasing the oxidant stoichiometry when the hydrogen concentration is higher than a second threshold concentration (for example, 20 ppm of hydrogen), which correlates to operating conditions which are indicative of actual or potential oxidant starvation. The first threshold concentration may be, for example, the lower detection limit of the hydrogen sensor that is used to monitor the cathode exhaust stream. The second threshold concentration is greater than the first threshold concentration. When the hydrogen concentration is between the first and second threshold concentrations, the controller does not take any action to adjust the oxidant stoichiometry.

A problem with using the hydrogen concentration measured in the cathode exhaust stream to detect oxidant starvation is that oxidant starvation is not the only possible cause for hydrogen gas being detected at the cathode. For example, when the fuel comprises hydrogen, holes or cracks may form in the membrane or seals and permit reactants to "cross over" from the anode side to the cathode side, and vice versa. If significant reactant crossover is detected, the conventional response is to shut down the fuel cell so that it may be repaired or replaced. Fuel crossover and oxidant starvation may both cause reduced fuel cell performance, but the detection of one condition requires a response which is different from the response required for the other condition. Oxidant starvation causing hydrogen to be produced at the cathode generally requires the oxidant stoichiometry to be increased, whereas fuel crossover, if significant, may require the fuel cell to be shut down. Therefore, for appropriate action to be taken, it is desirable for the controller to be able to distinguish between oxidant starvation and fuel crossover when the fuel comprises hydrogen. The following embodiments of the Hydrogen Sensor Method provide procedures for distinguishing between oxidant starvation and fuel crossover.

The Hydrogen Sensor Method may further comprise steps for reducing the hydrogen gas concentration within the cathode exhaust stream when the hydrogen gas concentration is greater than a second threshold concentration, wherein the steps comprise comparing the oxidant stream mass flow rate to a maximum desired mass flow rate, and (a) if the oxidant stream mass flow rate is less than the maximum desired mass flow rate, increasing the oxidant mass flow rate (that is, if raising the oxidant mass flow rate results in less hydrogen being detected at the cathode, then it is confirmed that oxidant starvation was likely the reason for hydrogen being detected; if oxidant starvation is not the source of the hydrogen at the cathode, the oxidant stream mass flow rate will quickly increase to the maximum desired mass flow rate and the controller will determine that fuel crossover is the likely hydrogen source); and (b) if the oxidant mass flow rate is already greater than or equal to the maximum desired mass flow rate, ceasing operation of the fuel cell if the hydrogen gas concentration is greater than a third concentration threshold which is greater than the first and second concentration thresholds (that is, since the oxidant stream mass flow rate is already at, or exceeds, the desired maximum, oxidant starvation is not the likely source of the hydrogen in the cathode exhaust stream; since the hydrogen concentration is above the third threshold, this indicates that there may be an excessive amount fuel passing through leaks between the anode and cathode); and generating a warning signal and continuing to operate the fuel cell if the hydrogen gas concentration is less than the third concentration threshold (that is, the value of the third threshold is selected so that the fuel cell system can be safely operated when the hydrogen concentration in the cathode exhaust stream is less than the third threshold).

The Hydrogen Sensor Method may further comprise continuously monitoring the cathode exhaust stream for the hydrogen gas concentration and determining whether the hydrogen gas concentration is increasing or decreasing, and when the hydrogen gas concentration is greater than a second threshold concentration, the method further comprises:

maintaining a substantially constant oxidant stoichiometry when the hydrogen concentration is decreasing; and increasing the oxidant stoichiometry when the hydrogen concentration is increasing.

In addition to monitoring whether hydrogen concentration is increasing or decreasing, when the hydrogen gas concentration is greater than a second threshold concentration, the method may also comprise additional steps to determine whether the source of the hydrogen is oxidant starvation or fuel crossover. For example, the additional steps may comprise:

measuring fuel cell voltage and comparing it to a voltage threshold value (for a Ballard® MK V fuel cell, the voltage threshold value could be, for example, 100 millivolts), and if the fuel cell voltage exceeds the voltage threshold value and the hydrogen gas concentration is increasing, decreasing the pressure of the fuel stream (in this case, since voltage exceeds the threshold value, the reason for the increasing hydrogen concentration is probably a leak; to reduce the effect of the leak, the method preferably comprises controlling the fuel stream pressure so that it is less than or equal to the pressure of the oxidant stream);

if the fuel cell voltage is less than the voltage threshold value, the hydrogen gas concentration is increasing, and oxidant mass flow rate is less than a desired maximum, then increasing the oxidant stoichiometry (in this case, since oxidant mass flow rate is less than the desired maximum, the cause for the low cell voltage and the presence of hydrogen gas may be oxidant starvation, and the controller attempts to correct this condition by increasing the oxidant stoichiometry); and if the fuel cell voltage is less than the voltage threshold value, the hydrogen gas concentration is increasing, and oxidant mass flow rate is greater than or equal to a desired maximum, then decreasing the pressure of the fuel stream (in this case, the low cell voltage may be caused by oxidant starvation or fuel leaking from the anode to the cathode; since the oxidant mass flow rate is already greater than or equal to the desired maximum, the pressure of the fuel stream is reduced, thereby reducing fuel cell power output and oxygen consumption at the cathode, to counter oxidant starvation and reduce the effect of any leaks).

Further additional steps may be taken to confirm whether the detected hydrogen gas concentration is caused by oxidant starvation or fuel crossover. For example, the method may also comprise regulating fluid pressure of the oxidant and fuel streams to increase or decrease a pressure differential between the oxidant and fuel streams to help determine whether the hydrogen measured at the cathode is caused by a leak or by oxidant starvation. If the change in the pressure differential has a significant effect on the measured hydrogen concentration, then it can be determined that there is a significant problem with hydrogen crossover.

For any of the above-described methods, the oxidant stoichiometry is typically adjusted by controlling the speed of the oxidant compressor or blower. However, other methods of changing the oxidant stoichiometry may also be used, such as adjusting the oxidant concentration in the oxidant supply stream or changing the electrical power output of the fuel cell without changing the mass flow rate of the oxidant supply stream. When the oxidant stream mass flow rate is adjusted, it is typically changed by a fixed amount or by a fixed percentage of the instant oxidant stream mass flow rate. Alternatively, oxidant stoichiometry may be adjusted by adjusting the oxidant stream mass flow rate by an amount that is dependent upon the magnitude of the detected hydrogen gas concentration. For example, the controller may be programmed to reduce the oxidant stoichiometry by a larger amount when a large surplus of oxygen is detected compared to when only a small surplus of oxygen is detected.

The method of controlling the oxidant delivery subsystem to reduce parasitic power consumption may comprise calibrating an oxidant delivery subsystem for a fuel cell. For example, the calibration method may comprise:

(a) operating the fuel cell at a particular electrical power output;

(b) supplying an oxidant stream to a cathode of the fuel cell;

(c) adjusting the operating speed of a mechanical oxidant delivery device;

(d) measuring an operational characteristic that corresponds to dV/d(oxidant stoichiometry); and (e) recording as the desired operating speed for said particular electrical power output, said operating speed when said dV/d(oxidant stoichiometry) is equal to a predetermined value.

The calibration method may be repeated for a plurality of electrical power outputs so that the desired operating speed for the mechanical oxidant delivery device may be determined and recorded in a look-up table for many different electrical power demands. The desired operating speed may then be determined by referring to a look-up table for the operating speed that corresponds to the instant electrical power demand.

An advantage of the calibration method is that it may be used throughout the operating life of the fuel cell to adjust for changes in the fuel cell over time. For example some of the fuel cell properties may be subject to degradation over time and that may change the stoichiometry requirements over the operational lifetime of the fuel cell.

The present method and apparatus also controls the amount of oxidant supplied to a fuel cell stack and reduces system inefficiencies caused by the over-supply of oxidant. Preferably, the method also controls the oxidant delivery subsystem to increase the oxidant stoichiometry to avert oxidant starvation conditions. Accordingly, a method of operating a fuel cell is provided that detects when the oxidant stoichiometry may be decreased or increased, and when the flow of oxidant should be discontinued altogether.

The present method may also be employed to operate a fuel cell and further reduce parasitic power consumption by controlling the supply of fuel to reduce excess fuel flow. The same principles that apply to the present method for controlling the oxidant supply apply to a method for controlling the fuel supply. Fuel cells typically employ a mechanical device, such as, for example, a compressor or pump, to supply a fuel stream to the anode(s) of the fuel cell(s). Therefore, parasitic power consumption may be reduced by reducing fuel stoichiometry to reduce the amount of excess fuel supplied to the fuel cell anode(s) and the work performed by the compressor. A reduction of the fuel stoichiometry generally causes an increase in dV/d(fuel stoichiometry). According to the present method, fuel stoichiometry is kept within a predetermined range by reducing fuel stoichiometry until dV/d(fuel stoichiometry) increases above a predetermined threshold value. The predetermined range and threshold value depend upon the particular characteristics and operating conditions of each particular fuel cell or fuel cell stack. The predetermined range may be empirically determined, for example, with consideration to these factors.

Generally, it is desirable to reduce reactant stoichiometry until dV/d(reactant stoichiometry) is greater than about 0.02 volt. More preferably, the predetermined value for dV/d(reactant stoichiometry) is between 0.30 and 7.0 volts. The voltage drop is generally more severe with fuel starvation, compared to oxidant starvation and when cell voltage is one of the monitored characteristics, this effect may be used to help differentiate between oxidant or fuel starvation.

BRIEF DESCRIPTION OF THE DRAWINGS

The advantages, nature and additional features of the invention will become more apparent from the following description, together with the accompanying drawings, in which:

FIG. 2a is a plot of fuel cell voltage output as a function of oxidant stoichiometry for a solid polymer fuel cell operating at a current density of 500 amps per square foot (about 540 milliamps per square centimeter), during normal operation. FIG. 2b is a plot of fuel cell voltage output and dV/d(oxidant stoichiometry) as a function of oxidant stoichiometry for the same fuel cell experiment as FIG. 2a. FIG. 2c is a plot of dV/d(oxidant stoichiometry) as a function of oxidant stoichiometry for a fuel cell stack comprising four fuel cells;

In FIGS. 3a, 3b and 4–11, the logic diagrams illustrate a method of adjusting the oxidant stream mass flow rate to adjust the oxidant stoichiometry. In these embodiments, the oxidant stream mass flow rate may also be changed in response to changes in power output, with the illustrated method being used to adjust the oxidant stream mass flow rate and hence oxidant stoichiometry to prevent oxidant starvation and reduce parasitic power losses associated with supplying excess oxidant. In FIG. 12 the logic diagram illustrates a method of calibrating a fuel cell system to determine the desired oxidant stream mass flow rate to produce a particular power output at a predetermined oxidant stoichiometry.

DETAILED DESCRIPTION OF PREFERRED EMBODIMENTS

Figure 1:
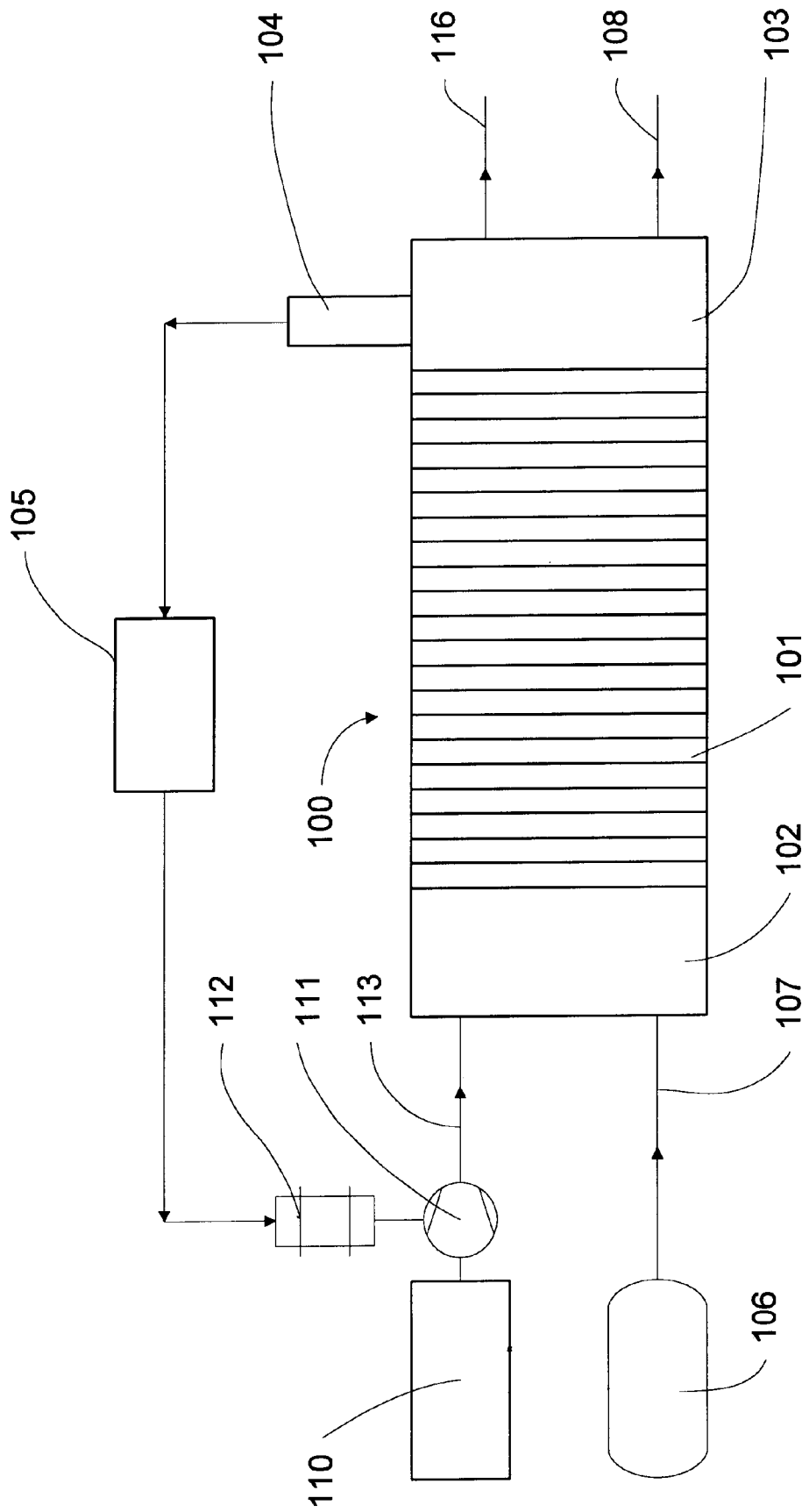
FIG. 1 is a schematic diagram of a fuel cell system comprising a detector for detecting oxidant starvation at the cathode and a controller for processing information from the detector and controlling the oxidant delivery subsystem to increase or decrease the oxidant stoichiometry.

FIG. 1 is a schematic diagram that shows the fuel cell power generating subsystem, the oxidant delivery subsystem, and the fuel delivery subsystem of a fuel cell system. The fuel cell power generating subsystem comprises a fuel cell stack 100, comprising a plurality of fuel cells 101 interposed between end plates 102 and 103. The fuel cell power generating subsystem further comprises sensor 104. When fuel cell stack 100 is operating, sensor 104 measures an operational characteristic that correlates to dV/d(OS). For example, when fuel cell stack 100 is operating at a constant current density, sensor 104 may measure an operational characteristic which relates to oxidant stoichiometry, cell voltage, or a characteristic which is typically detected when oxidant starvation is occurring at the fuel cell cathode.

Sensor 104 outputs a signal to controller 105 which processes the signal to determine when dV/d(OS) is within the desired operating range and when oxidant stoichiometry should be adjusted so that dV/d(OS) is restored to the desired operating range. For example, oxidant stoichiometry may be increased if the measured operational characteristic indicates an oxidant stoichiometry and/or the presence of conditions at the cathode which indicates actual, or a potential for, oxidant starvation. Preferably, the desired operating range prevents any oxidant starvation at the cathode that inhibits the fuel cell from producing the desired power output.

When the operational characteristic monitored by sensor 104 is the concentration of a gas in the cathode exhaust stream, sensor 104 may comprise a sensing element that is located within the interior of the cathode exhaust passage so that it is exposed to the cathode exhaust stream. The portion of the cathode exhaust passage where the sensing element is located may be a manifold or fluid passage internal to fuel cell stack 100, or in cathode exhaust passage 116.

In one embodiment, oxidant stoichiometry is controlled by using sensor 104 to measure an operational characteristic that correlates to oxidant stoichiometry. In another embodiment, sensor 104 detects an operational characteristic that is indicative of oxidant starvation at the cathode so that the oxidant stoichiometry may be controlled to reduce the amount of excess oxidant supplied to fuel cell stack 100, while preventing harmful oxidant starvation at the fuel cell cathodes (that is, in this embodiment controller 105 increases oxidant stoichiometry when sensor 104 detects actual or potential oxidant starvation and may decrease oxidant stoichiometry when oxidant starvation is not detected). In yet another embodiment, controller 105 checks for oxidant starvation while maintaining dV/d(OS) within a predetermined operating range; if oxidant starvation is detected, oxidant stoichiometry is increased until oxidant starvation is no longer detected, even though this may result in temporarily raising dV/d(OS) above the desired operating range.

The fuel delivery subsystem supplies a fuel stream from fuel supply 106 to the anodes of fuel cell stack 100 via fuel supply passage 107. When the fuel stream is a compressed gas, such as substantially pure hydrogen, fuel supply 106 may comprise a pressure vessel and a pressure control valve (not shown) for regulating the pressure of the fuel stream supplied to fuel cell stack 100. Alternatively, the fuel may be a liquid fuel such as methanol and fuel supply 106 may comprise a fuel tank. Liquid fuel may be supplied directly to fuel cell stack 100 (that is, a so called "liquid feed fuel cell"). Alternatively, fuels such as methanol, natural gas, or other hydrocarbons may be further processed to produce a gaseous hydrogen-containing reformate stream, in which case fuel supply 106 further comprises a fuel processor. When the fuel storage tank is not pressurized, the fuel delivery subsystem may further comprise a compressor or pump for controlling the pressure and mass flow rate of the fuel stream supplied to fuel cell stack 100. After the fuel stream has been directed to the anodes of fuel cell stack 100 to participate in the desired electrochemical reactions, a fuel-depleted fuel exhaust stream is exhausted from fuel cell stack 100 via fuel exhaust passage 108.

In the preferred embodiment illustrated by FIG. 1, the oxidant delivery subsystem comprises oxidant supply 110, mechanical device 111 for raising the pressure of the oxidant supply stream, and electric motor 112 coupled to mechanical device 111 for providing power thereto. Oxidant supply 110 may comprise a vessel for holding a supply of oxidant, but more typically, oxidant supply 110 comprises an air intake for receiving and filtering air from the surrounding atmosphere. From oxidant supply 110, the oxidant supply stream is directed to mechanical device 111, which raises the pressure of the oxidant stream. The pressurized oxidant supply stream is directed to the fuel cell power generating subsystem via oxidant supply passage 113.

Controller 105 receives an output signal from sensor 104. The output signal is processed by controller 105 to determine whether dV/d(OS) is within the desired operating range. Controller 105 communicates with the oxidant delivery subsystem to control the output of mechanical device 111 to maintain dV/d(OS) within a predetermined desired operating range (which preferably corresponds to an oxidant stoichiometry between about one and two).

For example, in the embodiment illustrated in FIG. 1, controller 105 controls electric motor 112 to control the speed of mechanical device 111. Mechanical device 111 is typically a compressor such as a rotary piston compressor or a reciprocating piston compressor. However, other types of mechanical devices may also be employed such as, for example a pump, a fan, or a blower. Mechanical device 111 raises the pressure of the oxidant supply stream to provide sufficient energy for directing the desired oxidant mass flow rate to the fuel cell cathodes within fuel cell stack 100. After the cathodes, the oxygen-depleted oxidant stream is ultimately exhausted from fuel cell stack 100 through cathode exhaust passage 116.

In a preferred method, during steady state operation, controller 105 controls the oxidant delivery subsystem so that the value of dV/d(OS) corresponds to operating conditions when oxidant stoichiometry is close to about one. Steady state operation is defined herein as an operational mode for the fuel cell system when the power output of fuel cell stack 100 is substantially constant. During normal operation, when the power demand is dynamic, controller 105 may allow dV/d(OS) to vary within a predetermined desired operating range that preferably corresponds to when oxidant stoichiometry is between about one and two. Normal operation is defined herein to exclude start-up and shut-down modes when controller 105 may allow a value for dV/d(OS) that corresponds to higher or lower oxidant stoichiometries, respectively. According to a preferred method, parasitic power demands are reduced during normal operation by reducing the power consumption of the oxidant delivery subsystem, by keeping oxidant stoichiometry less than two and preferably close to about one during steady state operation.

In a first preferred embodiment, sensor 104 measures the voltage output from fuel cell stack 100. During normal operation, at constant current density, fuel cell voltage output correlates to oxidant stoichiometry, so if sensor 104 measures fuel cell voltage output, sensor 104 may be used to determine oxidant stoichiometry and dV/d(OS). For example, plot A of FIG. 2a sets forth the voltage output (left y-axis) as a function of oxidant stoichiometry (x-axis) for a fuel cell operating at a constant current density of 500 amps per square foot (about 540 milliamps per square centimeter). That is, if at least one of cell voltage output or oxidant stoichiometry is known, then dV/d(OS) may be determined by referring to plot A. Plot C of FIG. 2b sets forth voltage output as a function of oxidant stoichiometry, and plot D of FIG. 2b sets forth dV/d(OS) as a function of oxidant stoichiometry. Plot D of FIG. 2b shows that by selecting a predetermined threshold value for dV/d(OS), oxidant stoichiometry may be reduced until it approaches one, without significant sacrifices to performance, as long as oxidant stoichiometry is increased when dV/d(OS) is greater than or equal to the predetermined threshold value. For example, for the fuel cell of FIG. 2b, a predetermined threshold value for dV/d(OS) could be a value between 0.02 and 0.3. For a threshold value of 0.3, oxidant stoichiometry could be reduced to about 1.2 before dV/d(OS) would increase to above about 0.3; at this point voltage output is still higher than 0.6 volts so fuel cell performance is not significantly compromised.

Figure 2A:
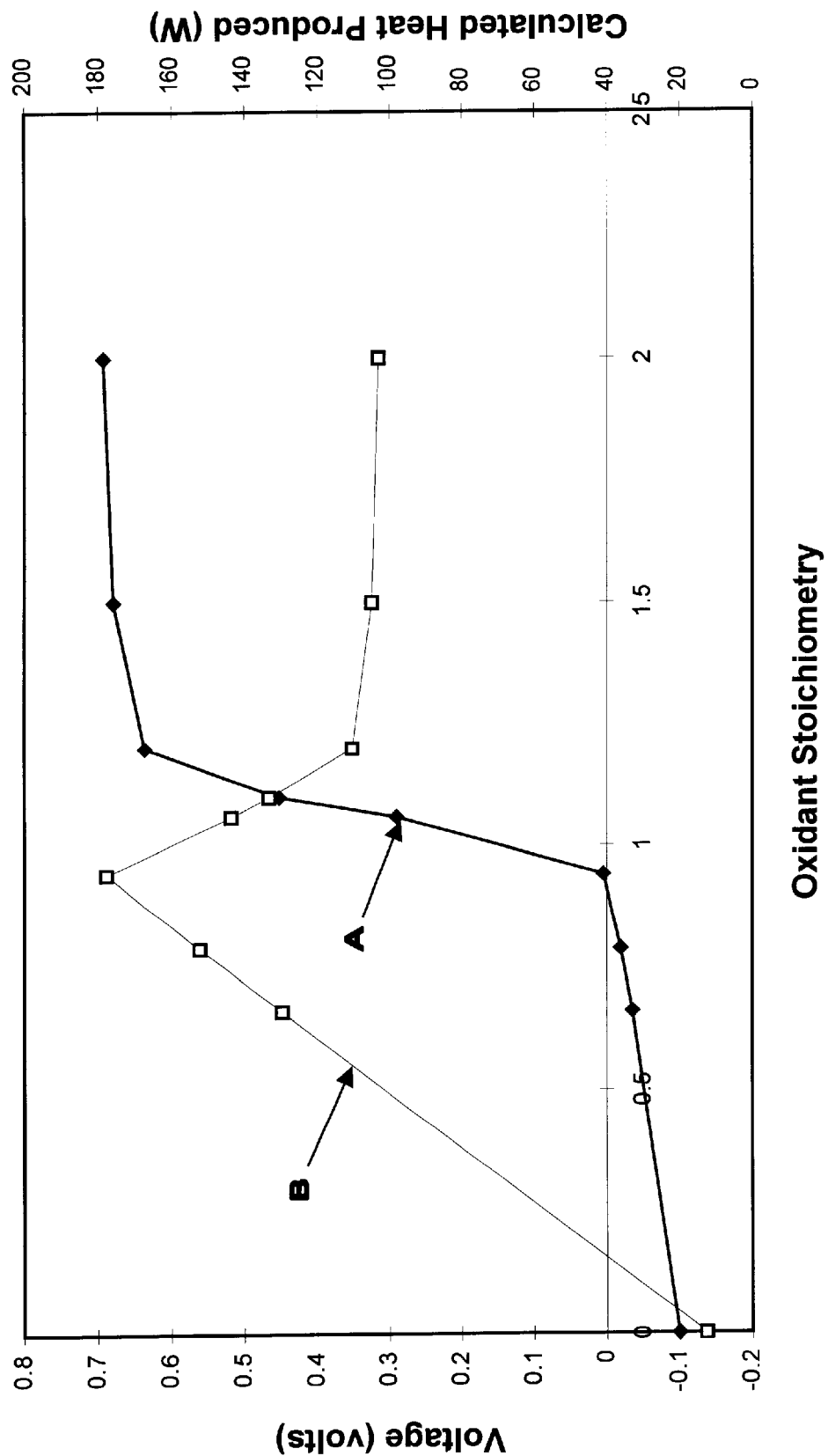
FIGS. 2a, 2b and 2c are plots of experimental data that illustrate the effect oxidant stoichiometry has on operational characteristics such as voltage output, heat produced, and dV/d(oxidant stoichiometry).
Figure 2B:
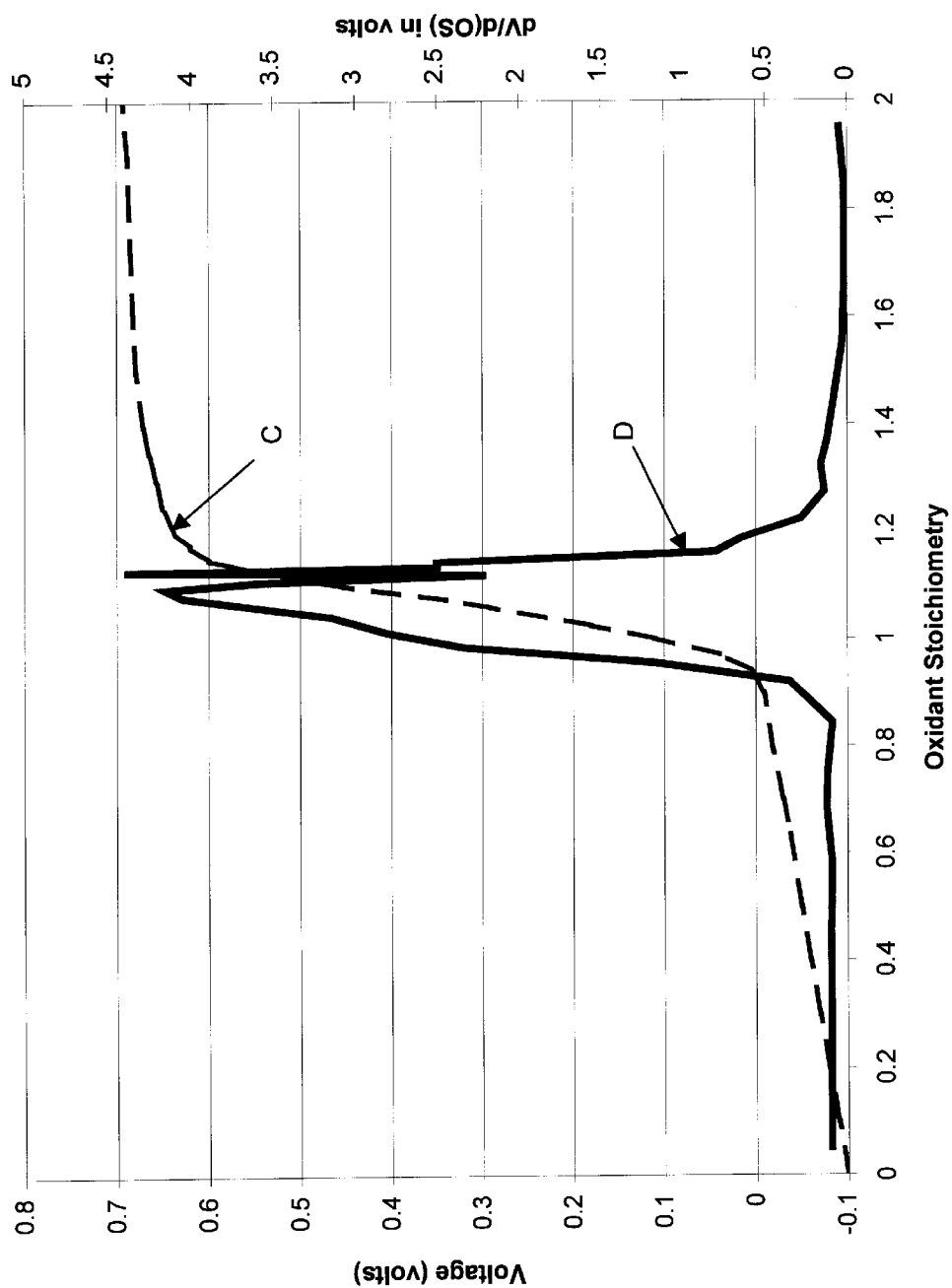

In the example of FIGS. 2a and 2b, the fuel cell was a Ballard® MK V fuel cell which employed a solid polymer ion exchange membrane made from Nafion™ 117 (a copolymer of tetrafluoroethylene and perfluorovinylether sulfonic acid). The electrodes were made from carbon fiber paper with a thickness of 0.09 inch (about 2.29 mm) obtained from Toray Industries Inc. The catalyst layer on the electrodes was platinum black catalyst mixed with a tetrafluoroethylene binder. The catalyst loading on each electrode was 4 mg/cm$^2$.

In the example of FIGS. 2a and 2b, if fuel cell voltage output is monitored, dV/d(OS) itself need not be monitored, since the relationship between voltage output and dV/d(OS) may be determined (see, for example, FIG. 2b). Accordingly, the oxidant delivery subsystem may be controlled to maintain voltage output between about 0.63 volt and about 0.67 volt, then oxidant stoichiometry will be maintained between about 1.2 and about 1.4. That is, if sensor 104 detects a voltage output higher than 0.67 volt, controller 105 controls the oxidant delivery subsystem to reduce the speed of mechanical device 111, thereby reducing parasitic power consumption, reducing oxidant stoichiometry, and keeping dV/d(OS) within the desired predetermined range. If sensor 104 detects a voltage output less than 0.63 volts, then controller 105 controls the oxidant delivery subsystem to increase the speed of mechanical device 111, to lower dV/d(OS) and increase voltage output and oxidant stoichiometry, thereby preventing oxidant starvation at the fuel cell cathodes.

Persons skilled in the art will recognize that fuel cell stacks, with different features, such as, for example, the size of the electrochemically active area, may operate under the same conditions and produce different voltages from those shown in FIG. 2a. However, for any particular fuel cell or fuel cell stack, a similar relationship between voltage output and oxidant stoichiometry can be plotted and used during normal operating conditions to control oxidant stoichiometry to reduce parasitic power consumption and maintain dV/d(OS) within a desired predetermined range.

FIG. 2a also shows plot B which sets forth, for the same fuel cell, theoretical heat produced within the fuel cell (right y-axis) as a function of oxidant stoichiometry (x-axis). The theoretical amount of heat produced within the fuel cell was calculated by calculating the heat balance for the fuel cell. That is, the calculation determined the heat produced by considering the total enthalpy of the inlet and outlet fluid streams and the power produced. Plot B shows that for this particular fuel cell there is a substantial increase in the heat produced therein when the oxidant stoichiometry is between 1.2 and 0.9. Because increases in temperature within a fuel cell may cause increases in parasitic power consumption by the cooling subsystem, it is important to also consider this effect when selecting the desired predetermined range for dV/d(OS). Accordingly, for some fuel cells the desired range for dV/d(OS) may correlate to an oxidant stoichiometry range between about 1.2 and 2.0.

Figure 2C:
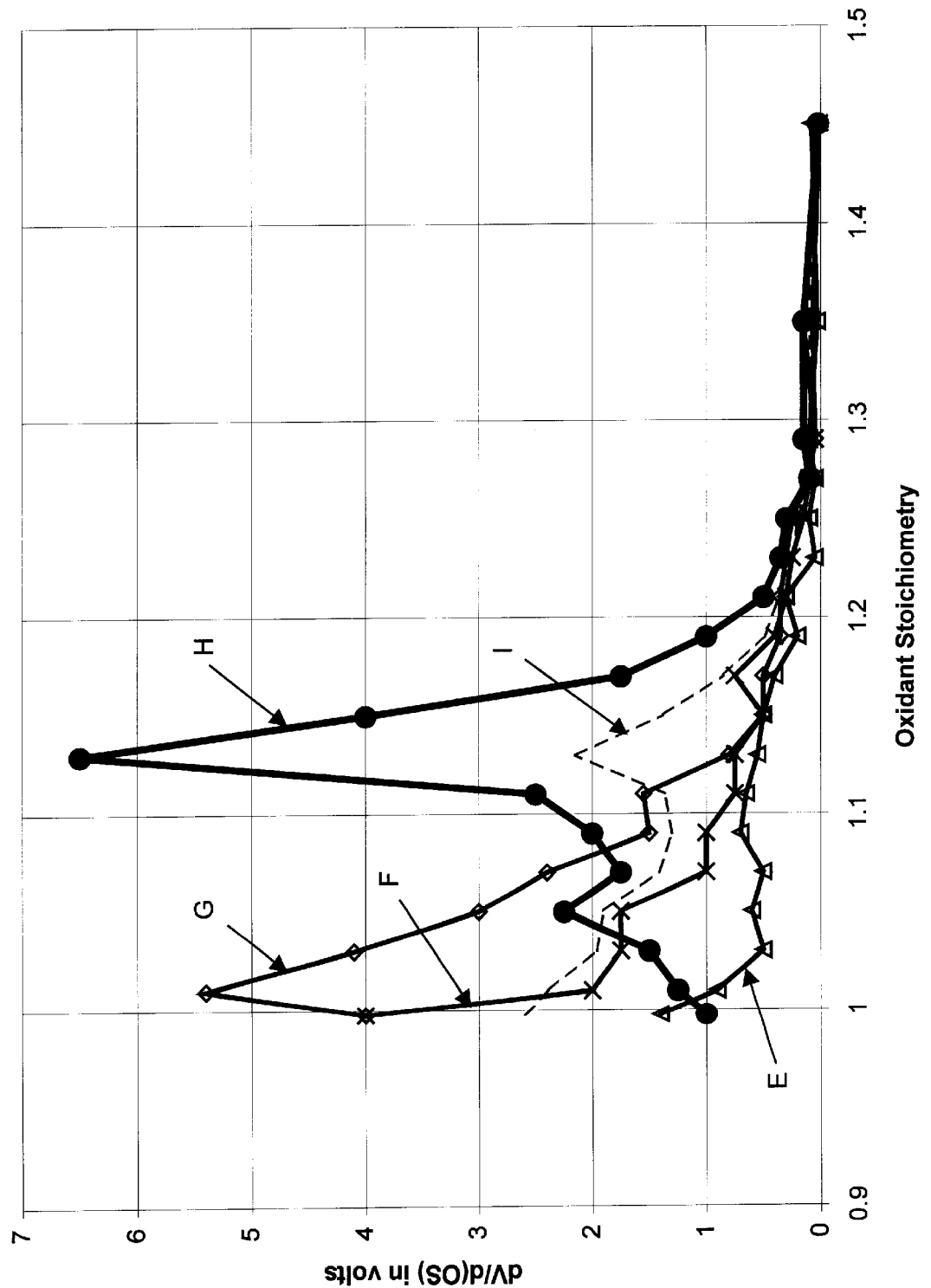

FIG. 2c is a plot of the data from four fuel cells that were arranged in a stack, with each fuel cell operating at a constant current density of 500 amps per square foot (about 540 milliamps per square centimeter). Plots E through H each set forth dV/d(OS) as a function of oxidant stoichiometry for a respective one of the four fuel cells in the stack. Plot I sets forth the average dV/d(OS) against oxidant stoichiometry. FIG. 2c, like FIG. 2b, shows the relationship between oxidant stoichiometry and dV/d(OS), and how dV/d(OS) progressively increases as oxidant stoichiometry is reduced towards one.

FIG. 2c shows that, within a fuel cell stack, there may be different values for dV/d(OS) for different fuel cells. In this case, the fuel cell may be controlled with reference to the average dV/d(OS). Alternatively, the value of dV/d(OS) for a selected fuel cell may be monitored to control the oxidant stoichiometry for an entire fuel cell stack. The selected fuel cell may be made more responsive to changes in oxidant stoichiometry so that oxidant stoichiometry may be controlled to prevent large fluctuations in fuel cell performance. For example, the selected fuel cell may be designed so that its voltage output decreases more rapidly than the voltage output of the other fuel cells in the stack, so that oxidant stoichiometry may be increased before there is a significant decrease in the voltage output of the fuel cell stack.

The logic diagrams of FIGS. 3a, 3b, and 4–12 will be explained with reference to the components of the fuel cell system shown in FIG. 1.

Figure 3A:
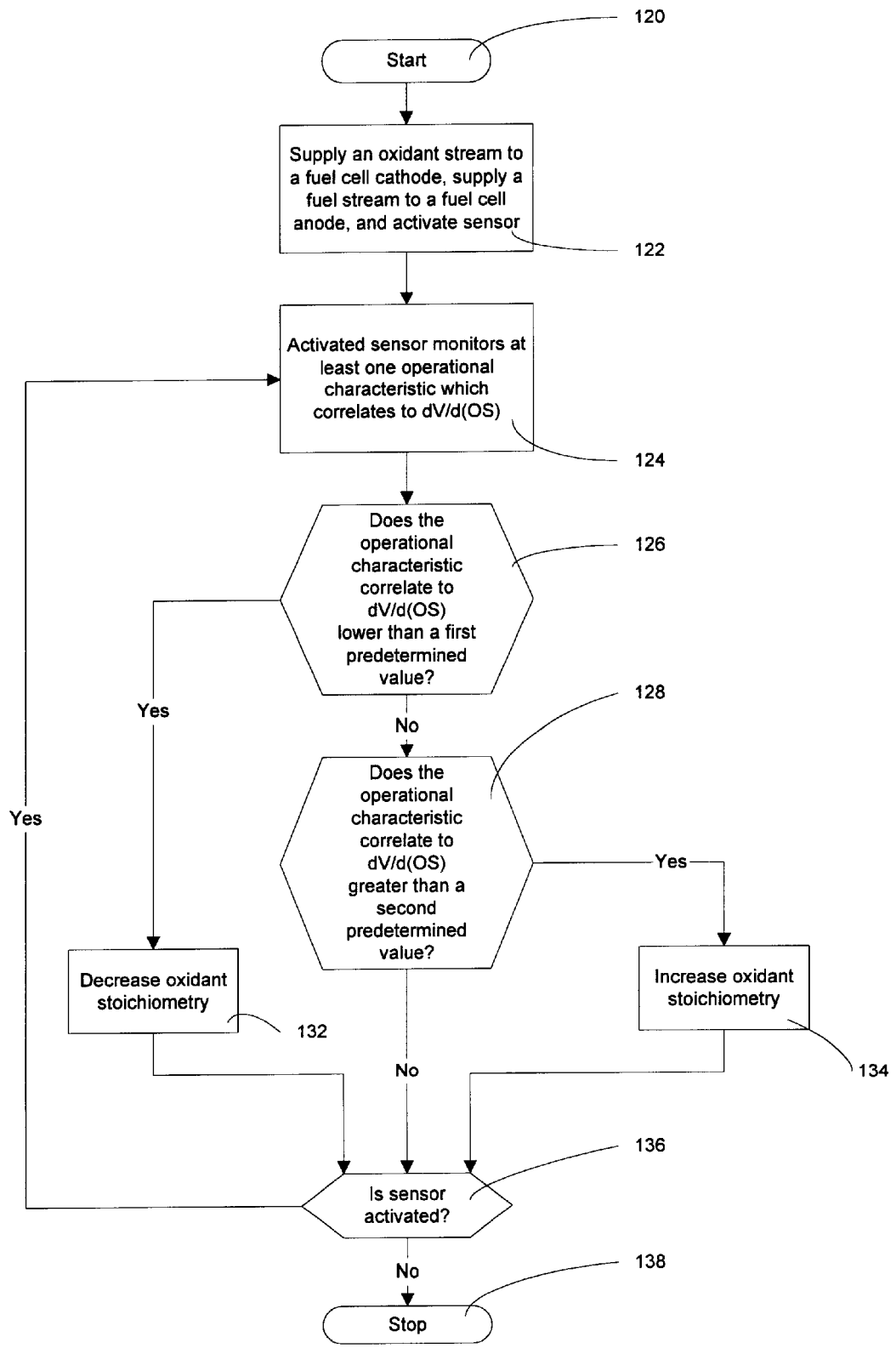
FIGS. 3a, 3b and 4–12 are logic diagrams illustrating various preferred embodiments of the present method of operating a fuel cell and controlling the oxidant stoichiometry.

In a preferred embodiment, controller 105 may be programmed to perform the method shown in the logic diagram of FIG. 3a. In this method, controller 105 controls oxidant stoichiometry to reduce parasitic power consumption in response to signals emitted from sensor 104, by controlling oxidant stream mass flow rate using motor 112 and mechanical device 111. The method starts at step 120. In step 122 reactants are supplied to fuel cell stack 100 and sensor 104 is activated. During operation of stack 100, at step 124, sensor 104 monitors at least one operational characteristic that correlates to dV/d(OS). For example, for a fuel cell operating at a constant current density, the operational characteristic measured by sensor 104 may be fuel cell voltage output or an operational characteristic which correlates to oxidant stoichiometry, because if one of these operational characteristics is known, dV/d(OS) may be determined by referring to a plot of cell voltage as a function of oxidant stoichiometry (for example, FIG. 2a). Sensor 104 may measure the voltage output of fuel cell stack 100 or the voltage output of selected individual fuel cells 101, to determine dV/d(OS) for stack 100 or individual fuel cells 101, respectively. Alternatively, sensor 104 may measure the concentration of oxygen in a cathode exhaust stream to determine oxidant stoichiometry, which correlates to dV/d(OS). The oxygen concentration in the oxidant supply stream is known when it is pure oxygen (that is, 100%), or air (that is, about 20%). If the concentration of oxygen in a dilute oxidant supply stream is not constant, then an oxygen sensor may be used to measure the oxygen concentration upstream of fuel cell stack 100. Alternatively, if fuel cell current output and oxygen concentration in the cathode exhaust are known, controller 105 may calculate oxidant stoichiometry by determining the amount of oxygen consumed by the fuel cell to generate the electrical current.

In another embodiment, when sensor 104 measures hydrogen concentration in the cathode exhaust stream, the detection of hydrogen above a threshold amount, (for example, 20 ppm), may indicate that a significant amount of oxidant starvation is occurring at a fuel cell cathode. In this embodiment, the concentration of hydrogen determines the severity of the oxidant starvation that correlates to an oxidant stoichiometry for the fuel cell. Accordingly, sensor 104 outputs a signal that is representative of the measured value of any operational characteristic that itself, or in combination with other factors, correlates to dV/d(OS). The output signal from sensor 104 may thus be received and processed by controller 105 to calculate or infer dV/d(OS) so that controller 105 may control the oxidant stoichiometry to reduce parasitic power consumption.

In steps 126 and 128, controller 105 determines whether the operational characteristic correlates to a dV/d(OS) that is within the desired range. At step 126, if the operational characteristic correlates to a dV/d(OS) that is lower than a first predetermined value (that is, the upper limit of the desired oxidant stoichiometry range), then, at step 132 controller 105 causes the oxidant stoichiometry to be decreased. At step 128, if the operational characteristic correlates to a dV/d(OS) that is greater than a second predetermined value (that is, the lower limit of the desired oxidant stoichiometry range), then, at step 134 controller 105 causes the oxidant stoichiometry to be increased. If it is determined that the present oxidant stoichiometry is within the desired range (that is, the answer is "no" to the questions posed in both steps 126 and 128), then no steps are taken to change oxidant stoichiometry. After steps 128, 132 or 134, it is determined whether sensor 104 is still activated. As long as sensor 104 remains activated, the method repeats by returning to step 124. If sensor 104 is no longer activated, the process stops at step 138.

Figure 3B:
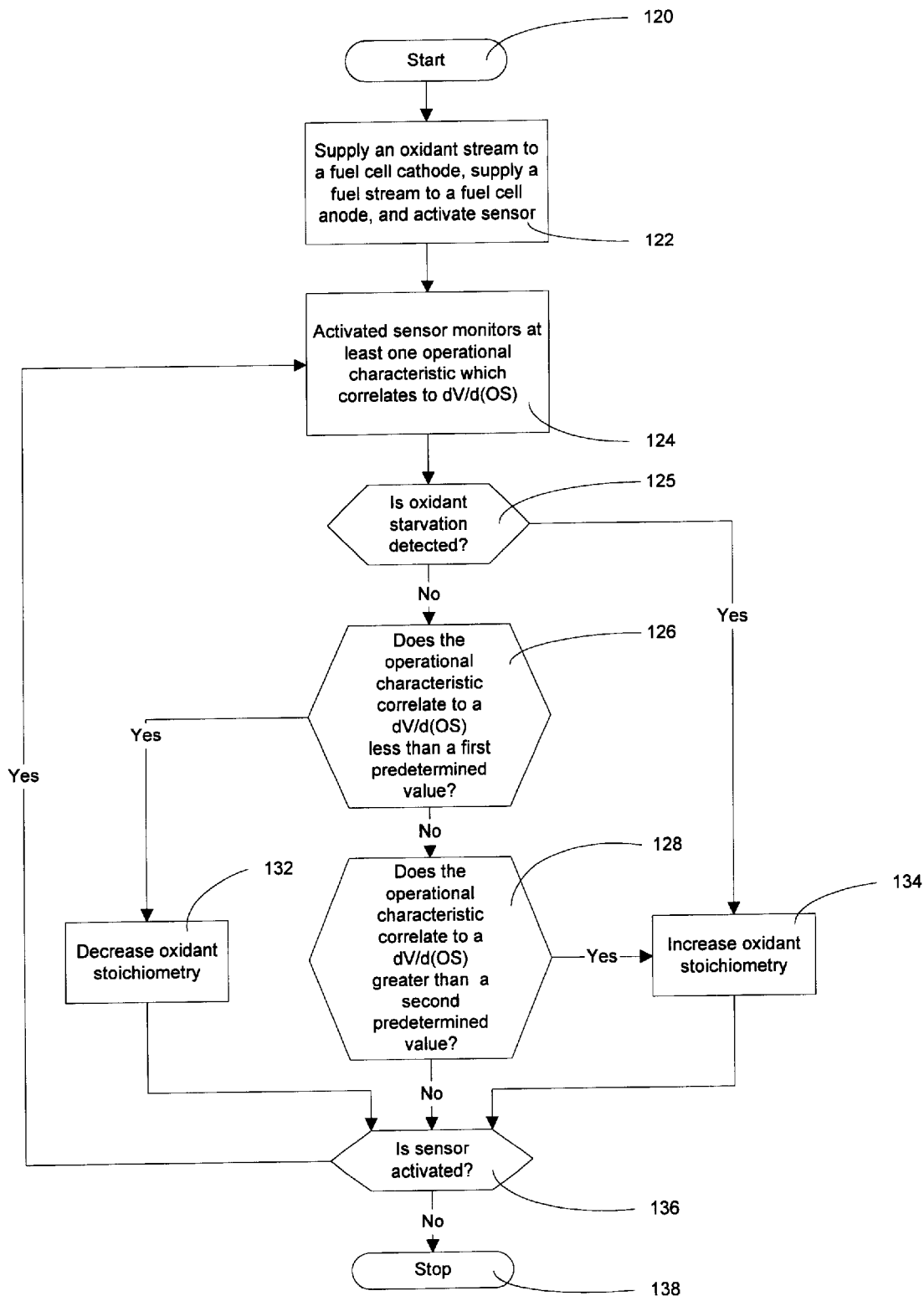

The method of FIG. 3b is substantially the same as the method of FIG. 3a, with the addition of step 125, which provides for specifically checking whether or not oxidant starvation is detected. For the steps that are common to the methods of both FIG. 3b and FIG. 3a the same reference numerals are employed.

The desired operating range for the oxidant stoichiometry may have a lower limit that normally prevents significant oxidant starvation at the cathodes. However, localized oxidant starvation may occur, even when oxidant stoichiometry is much higher than one (for example, even when oxidant stoichiometry is within the desired operating range). Localized oxidant starvation may occur at portions of the cathode where the oxidant is prevented from accessing the catalyst, for example where access is prevented by the accumulation of water. Localized starvation conditions may result in reduced performance, lower efficiency, and undesirable hydrogen production at the cathode. Localized oxidant starvation is difficult to detect because fuel cell stack 100, as a whole, may have a positive voltage within the desired operating range, while only a portion of the cathode is oxidant starved. Efficiency may be improved by counteracting localized starvation, for example, by temporarily increasing oxidant mass flow rate through the cathode to disperse accumulated water from the cathode.

Localized oxidant starvation may be detected by monitoring for irregularities that may be indicators of oxidant starvation, such as, for example, detecting a threshold hydrogen gas concentration (for example, greater than 20 ppm) in the cathode exhaust stream. The actual threshold hydrogen gas concentration selected for a particular fuel cell or fuel cell stack will depend upon the particular characteristics such as, for example, the number of fuel cells in a stack, the mass flow rate of oxidant stream, the type of electrolyte, and so forth. Localized oxidant starvation may not have a determinative effect on the voltage output of fuel cell stack 100, but any degree of oxidant starvation may result in the production of hydrogen at the cathode. Another method of detecting a possibility of localized oxidant starvation in fuel cell stack 100 is monitoring the voltage output of individual fuel cells 101. If an individual fuel cell has a lower voltage output than the other fuel cells in stack 100, this is an indication that there may be a localized oxidant starvation problem (for example, caused by the accumulation of water in the cathode of the fuel cell with the low voltage output).

According to the method of FIG. 3b, at step 125, if oxidant starvation is detected, then oxidant stoichiometry is increased at step 134. At step 125, if oxidant starvation is not detected, then the process beginning at step 126 is essentially the same as in the process of FIG. 3a.

Figure 4:
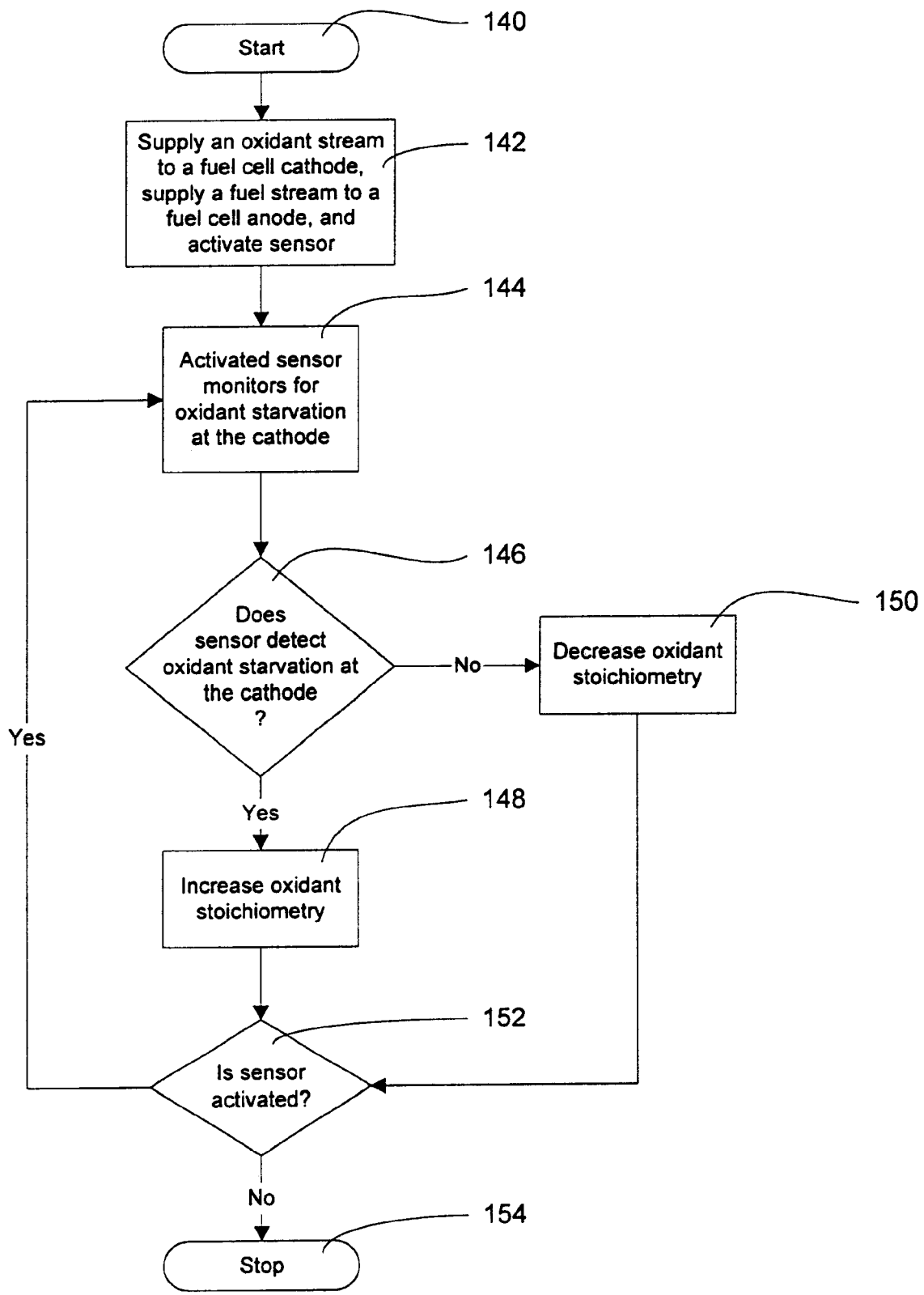

FIG. 4 illustrates another method of reducing oxidant stoichiometry to reduce parasitic power consumption wherein sensor 104 monitors for an operational characteristic that is indicative of oxidant starvation at the cathode. The method of FIG. 4 starts at step 140. At step 142 an oxidant stream is supplied to a fuel cell cathode, a fuel stream is supplied to a fuel cell anode and sensor 104 is activated. At step 144 activated sensor 104 monitors for oxidant starvation at the cathode. Sensor 104 sends a signal to controller 105 that indicates when oxidant starvation is detected at the cathode. Sensor 104 may detect, for example, the voltage output of fuel cell stack 100 or selected individual fuel cells within stack 100. Alternatively, sensor 104 may detect the concentration of oxygen or hydrogen in a cathode exhaust stream. For example, if no oxygen, or only a "very low concentration", is detected, this is a good indication that oxidant starvation may be occurring at the cathode. The definition of what constitutes a "very low concentration" of oxygen depends upon the operating conditions and the properties of the reactants. For example, if the inlet oxidant stream comprises about 20% oxygen, then a "very low concentration" may be 5% oxygen in the cathode exhaust stream (that is, corresponding to an overall oxidant stoichiometry of about 1.33). However, if, for example, the inlet oxidant stream comprises 30% oxygen, then a "very low concentration" may be 7% (that is, corresponding to an overall oxidant stoichiometry of about 1.30). Preferably, the concentration of oxygen selected as a threshold value corresponds to a predetermined oxidant stoichiometry, with consideration given to the oxygen concentration in the inlet oxidant stream. Similarly, if sensor 104 measures a hydrogen concentration above a threshold amount (for example, above 20 ppm), then it is likely that oxidant starvation is occurring at a fuel cell cathode. The values for the threshold concentrations depend upon the particular characteristics of the fuel cell system, such as, for example, the oxidant stream flow rate, the size of the fuel cells and the number of fuel cells in a stack.

At step 146, controller processes the signal from sensor 104 and determines whether oxidant starvation, or a likelihood of oxidant starvation, has been detected. In either case, if such a condition is detected, then the oxidant stoichiometry is increased at step 148. If, at step 146 it is determined that there is no indication of oxidant starvation at the fuel cell cathodes, then the oxidant stoichiometry is decreased at step 150.

After either step 148 or 150, controller 105 checks at step 152 whether sensor 104 is still activated. If sensor 104 is no longer activated, then the method stops at step 154. As long as sensor 104 remains activated, the method of controlling the oxidant stoichiometry repeats by returning to step 144.

The logic diagrams of FIGS. 5–12 are directed to examples of methods wherein the operational characteristic measured by sensor 104 is the concentration of hydrogen gas in a cathode exhaust stream. In view of the present disclosure, persons skilled in the art will understand that, alternative operational characteristics such as, for example, fuel cell voltage output or oxidant concentration, may also be used in conjunction with the methods set out in the logic diagrams of FIGS. 5–12. That is, sensor 104 may be a sensor that measures any operational characteristic of the fuel cell system that may be employed by controller 105 to determine dV/d(OS) and/or the presence of oxidant starvation at the cathode.

Figure 5:
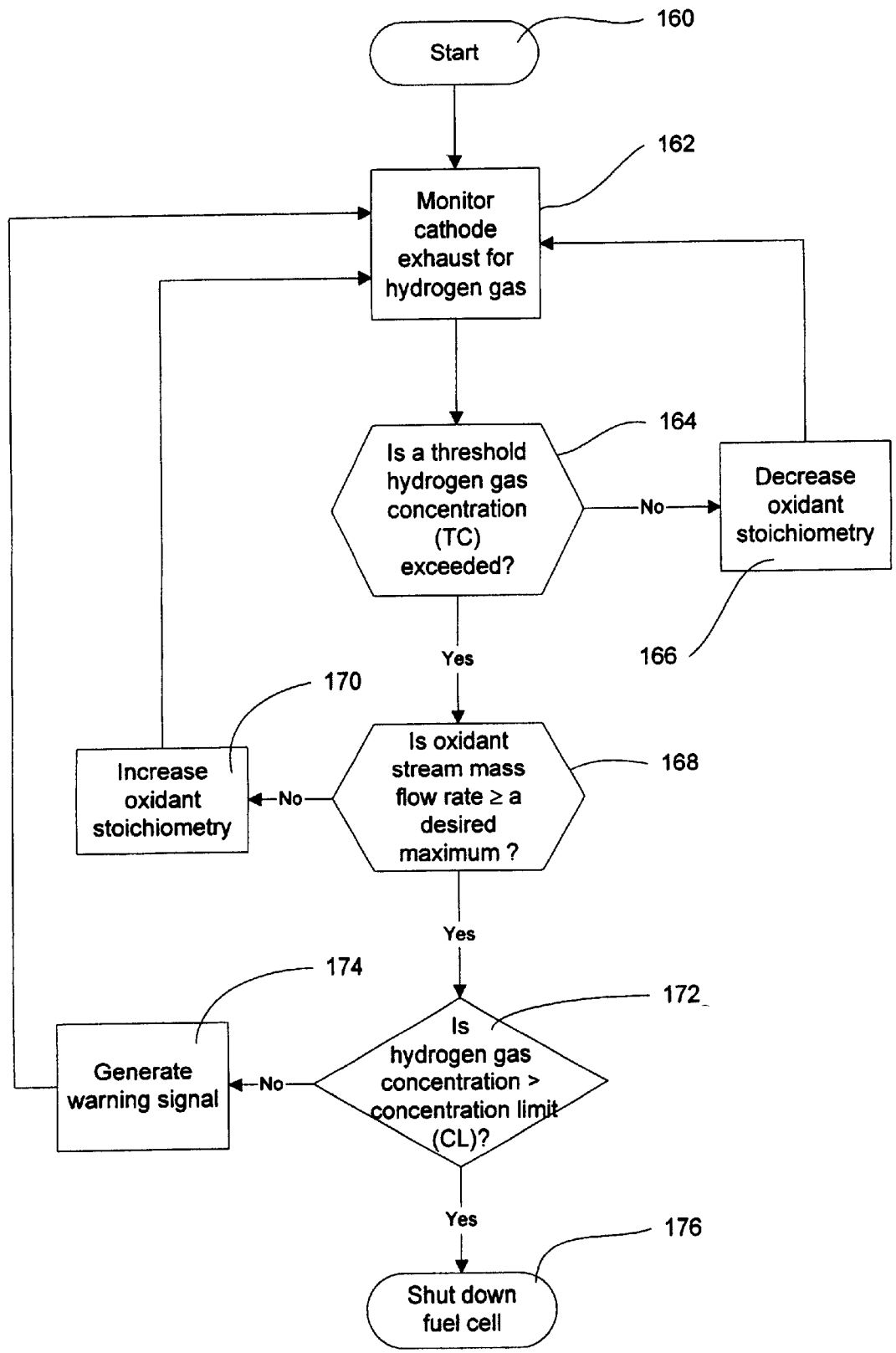

FIG. 5 is a logic diagram for a method wherein controller 105 determines whether to increase or decrease oxidant stoichiometry based upon whether the hydrogen gas concentration measured by sensor 104 exceeds a predetermined threshold concentration (TC). The method starts at step 160. At step 162 sensor 104 monitors the cathode exhaust stream for hydrogen gas. At step 164 controller 105 determines whether the hydrogen gas concentration measured at step 162 exceeds TC. Minute quantities of hydrogen in the cathode exhaust stream may not be indicative of a problem. Accordingly, TC is a threshold hydrogen gas concentration that is empirically known for a particular fuel cell to be indicative of oxidant starvation at the cathodes. For example, for a Ballard® MK V fuel cell, controller 105 may be programmed so that TC is a hydrogen concentration of 20 ppm. Until sensor 104 detects a hydrogen concentration greater than or equal to TC, controller 105 reduces oxidant stoichiometry at step 166, typically by reducing the mass flow rate of the oxidant supply stream (thereby reducing parasitic power consumption).

When sensor 104 detects a hydrogen concentration greater than TC, this is an indication that oxidant starvation is occurring (or is likely to occur) and controller 105 proceeds to step 168. At step 168, controller 105 determines whether the oxidant stream mass flow rate is greater than or equal to a desired maximum. If the oxidant stream mass flow rate is not greater than or equal to the desired maximum, then oxidant stoichiometry is increased at step 170. Normally oxidant stoichiometry is increased by controlling motor 112 to increase the speed of mechanical device 111. Alternatively, other measures may be used instead or in combination with controlling motor 112 to increase oxidant stoichiometry. For example, oxidant stoichiometry may be increased by reducing electrical power output without a corresponding reduction in oxidant stream mass flow rate.

If, however, it is determined at step 168 that the oxidant stream mass flow rate is in fact greater than or equal to the desired maximum mass flow rate, then, controller 105 proceeds to step 172 and determines whether to generate a warning signal (step 174) while continuing to operate the fuel cell system, or, shut down (cease operation of) fuel cell stack 100 at step 176. At step 172, controller 105 makes its determination by considering whether the hydrogen gas concentration is higher or lower than a predetermined concentration limit (CL). CL is typically a value much greater than TC. If the hydrogen concentration is higher than CL, this indicates that a much higher than normal concentration of hydrogen is present at the cathode. For example, if the fuel is hydrogen, a significant amount of fluid leakage between the anode and cathode may cause the hydrogen concentration in the cathode exhaust stream to exceed CL, and such a condition warrants shutting the fuel cell down so that the cause of the elevated hydrogen concentration may be investigated.

If the fuel cell system comprises an array of fuel cell stacks with each stack monitored in the manner depicted in FIG. 5, then the array may continue to produce electrical power, but with one stack shut down.

As noted above, operational characteristics other than hydrogen concentration in the cathode exhaust stream may be employed instead. For example, with reference to the logic diagram of FIG. 5, alternate equivalent steps are described herein for a sensor that measures fuel cell voltage output. Alternate steps are described using the same reference numerals, but with a suffixed "a". According to the alternate method, after starting the method at step 160a, a fuel cell voltage output sensor monitors output voltage at step 162a. At step 164a, controller 105 determines if the output voltage is lower than a predetermined threshold output voltage (TOV). In this example, the predetermined TOV preferably corresponds to a condition when there is a potential for oxidant starvation at the fuel cell cathode. If voltage output is lower than TOV, the oxidant stoichiometry is increased at step 170a, but not before first checking, at step 168a, that the oxidant stream mass flow rate is not already greater than or equal to a desired maximum. If fuel cell voltage output is not less than TOV, then controller 105 decreases oxidant stoichiometry at step 166a. At step 168a, if it is determined that oxidant stream mass flow rate is greater than or equal to a desired maximum, then controller 105 proceeds to step 172a. At step 172a, if the sensor measures an output voltage that indicates cell reversal, then controller 105 shuts down the fuel cell at step 176a. If cell reversal is not detected, then the fuel cell system may continue to operate, but with controller 105 generating a warning signal at step 174a.

Figure 6:
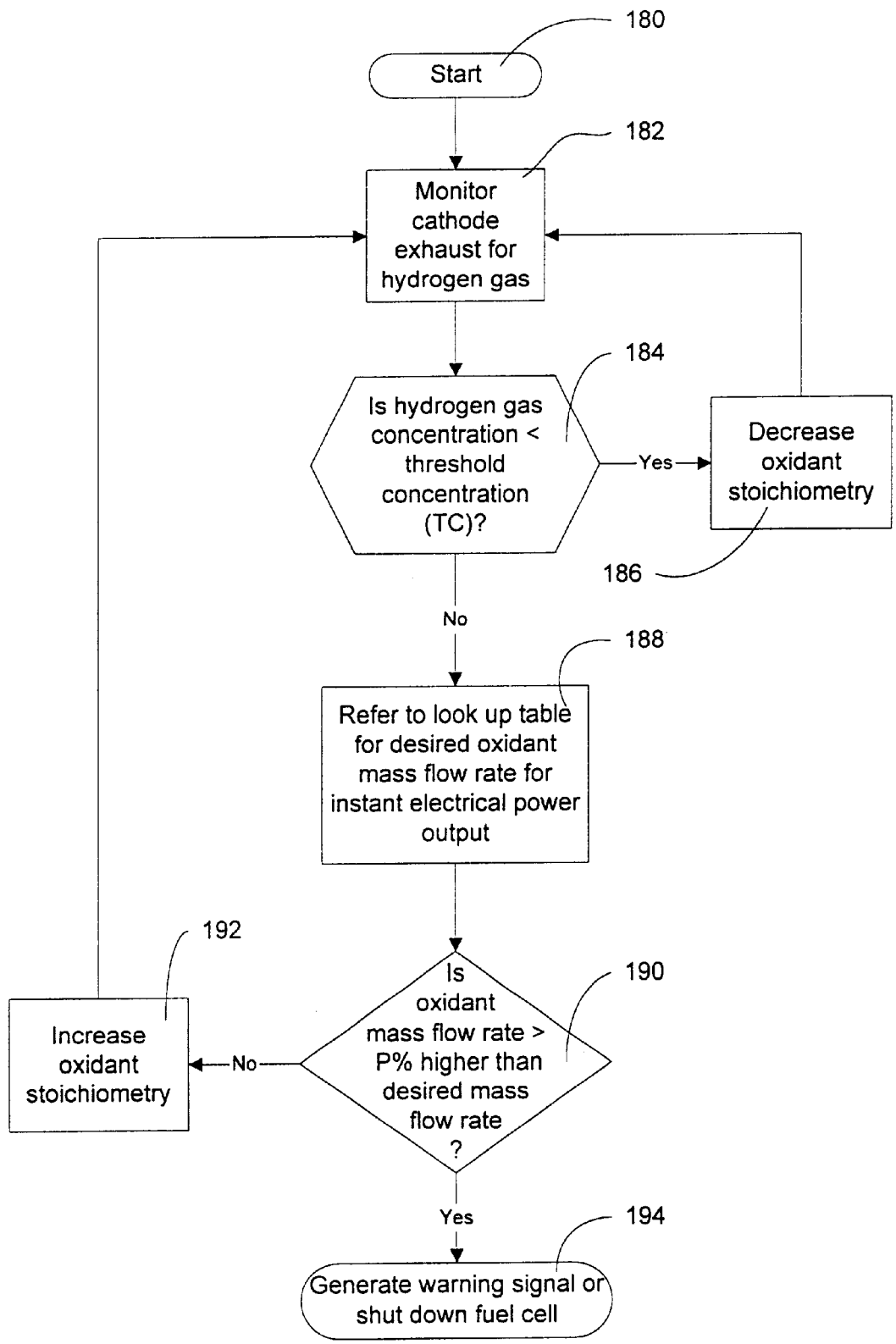

FIG. 6 is a logic diagram which illustrates a method wherein controller 105 determines an appropriate action with reference to a predetermined desired oxidant stoichiometry for the instant electrical power output. The method starts at step 180 with the supply of reactants to fuel cell stack 100 and activation of sensor 104. At step 182, sensor 104 monitors the cathode exhaust stream for hydrogen gas. At step 184, if sensor 104 measures a hydrogen gas concentration less than threshold concentration TC, the controller 105 decreases the oxidant stoichiometry at step 186. If sensor 104 does not detect a hydrogen gas concentration less than TC, then, at step 188, controller 105 refers to a look up table to determine the desired oxidant mass flow rate for the instant electrical power output. At step 190, controller 105 determines whether the actual oxidant mass flow rate is more than a predetermined amount (for example, P %)

higher than the desired oxidant mass flow rate. If the actual oxidant mass flow rate is not already greater than P % higher than the desired oxidant mass flow rate, then controller 105 increases the oxidant stoichiometry at step 192. If, however, the actual oxidant mass flow rate is greater than P % higher than the desired oxidant mass flow rate, then, at step 194, controller 105 generates a warning signal or shuts down the fuel cell. If controller 105 generates a warning signal, it may also control the fuel cell system to reduce the electrical power output or limit the peak power output. As with the embodiment of FIG. 5, in the method of FIG. 6, the magnitude of the measured hydrogen gas concentration may be used to determine the appropriate action (that is, a warning signal or shutting down (ceasing operation of) fuel cell stack 100).

Figure 7:
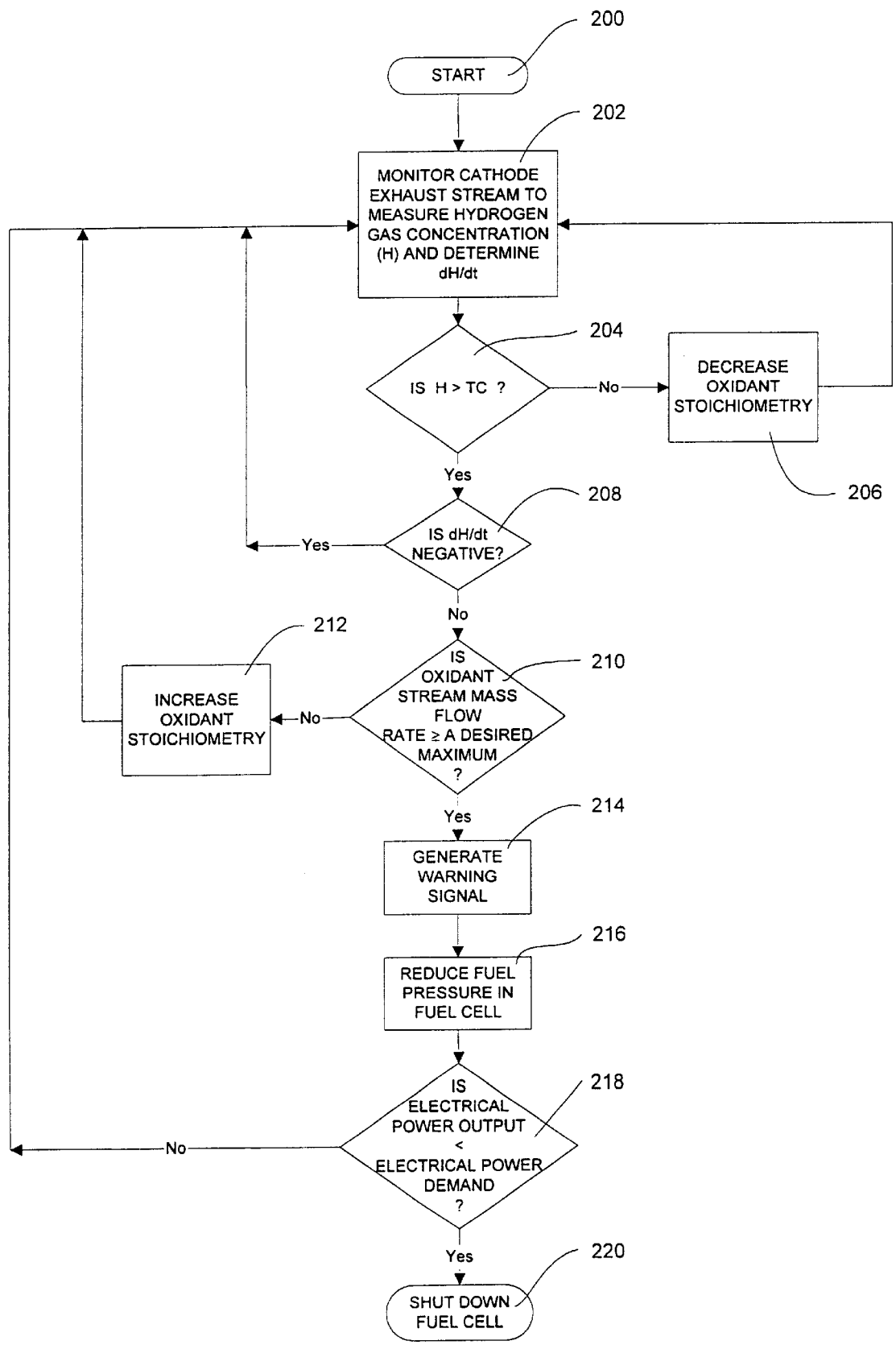
Figure 8:
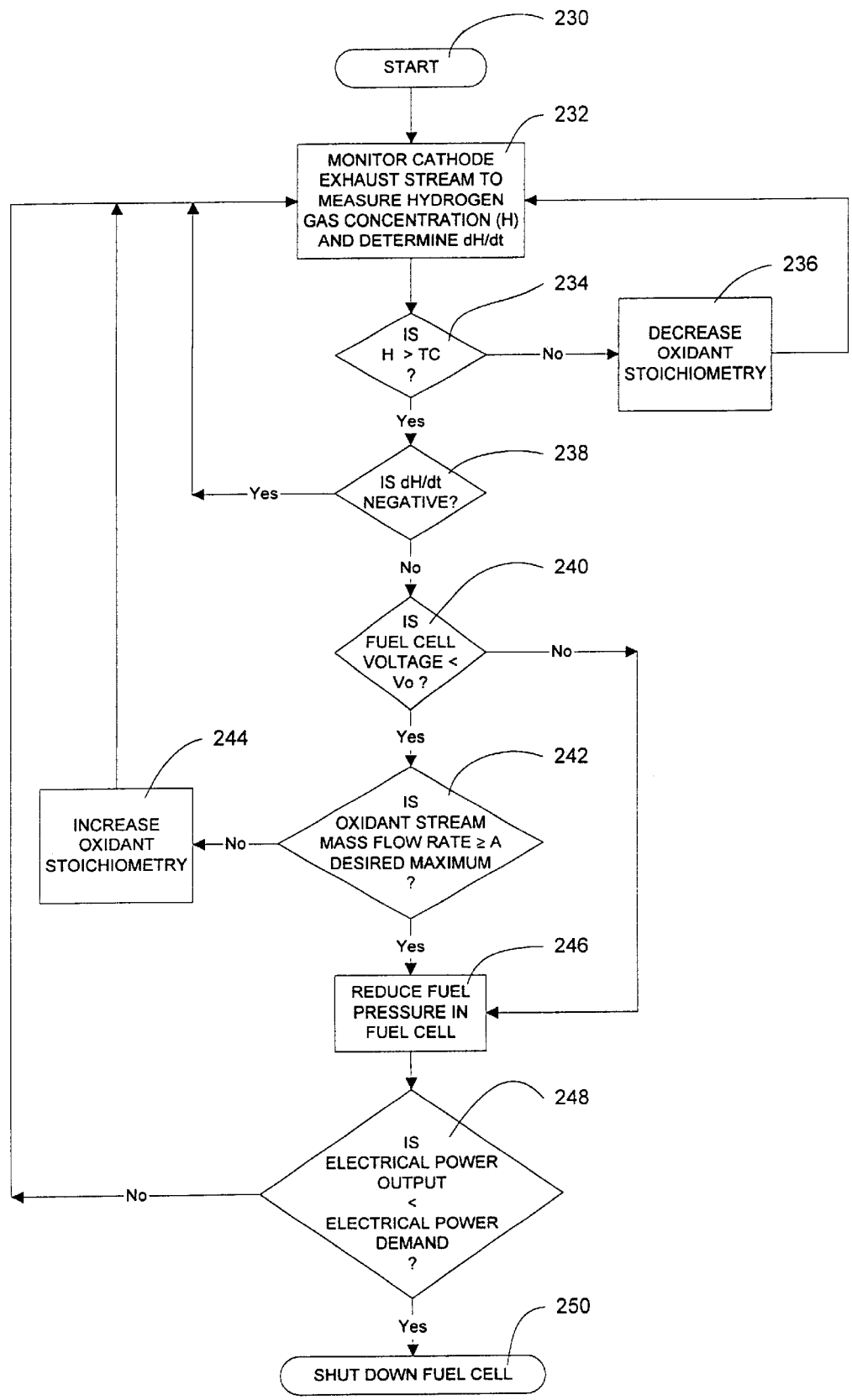
Figure 9:
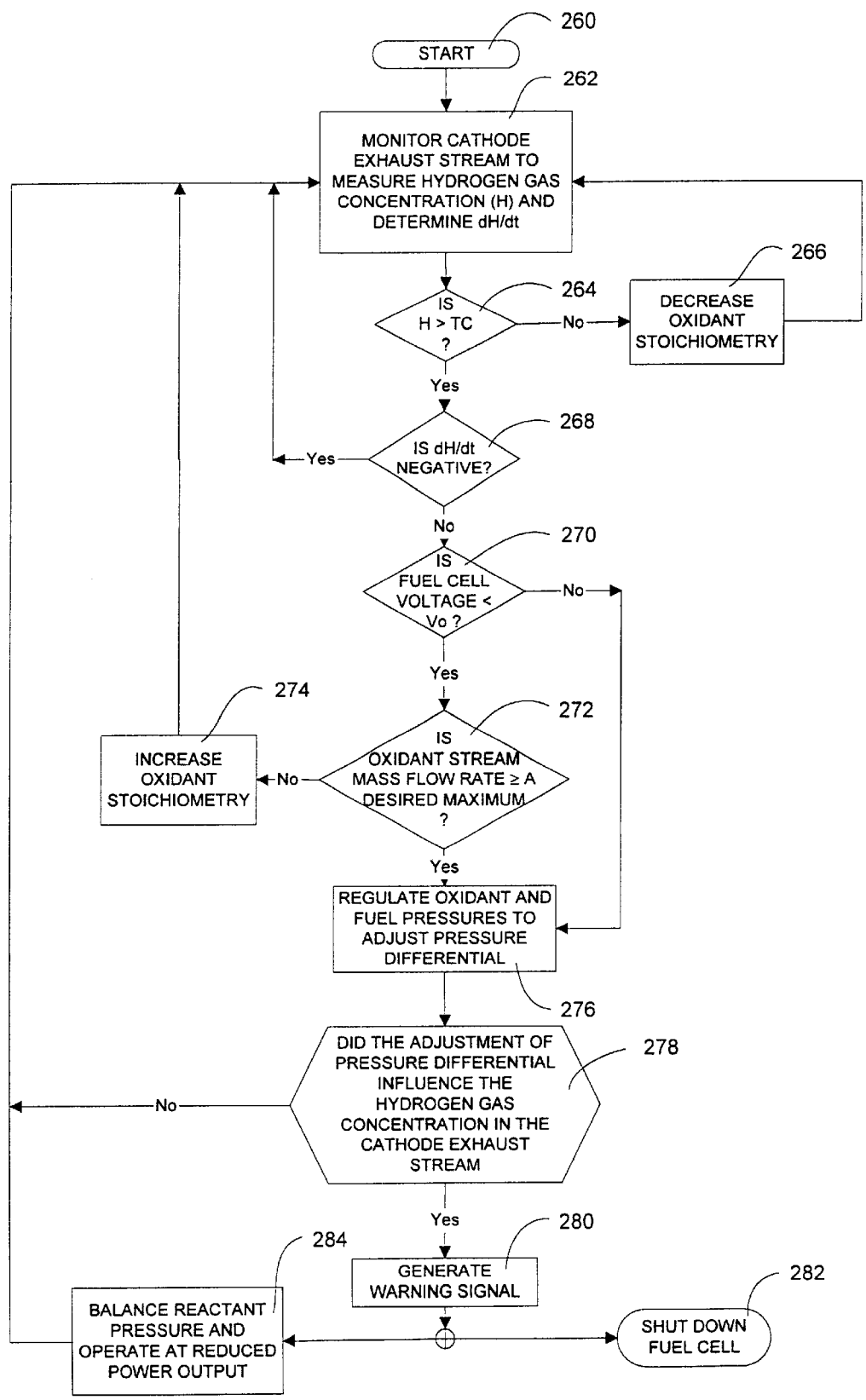

In the logic diagrams of FIGS. 7–9, the methods comprise determining whether the hydrogen gas concentration detected in the cathode exhaust stream is increasing or decreasing, and using this information to determine what action is appropriate in response to the changing hydrogen gas concentration.

With reference to FIG. 7, the method starts at step 200, by supplying reactants to fuel cell stack 100 and activating hydrogen sensor 104. At step 202 sensor 104 begins monitoring the cathode exhaust stream for hydrogen gas. Once activated, sensor 104 measures the hydrogen gas concentration in the cathode exhaust stream. Sensor 104 measures the instant hydrogen gas concentration (H) and controller 105 calculates dH/dt where dH is the change in H and dt is the change in time (at constant time intervals). By calculating whether dH/dt is positive, negative, or zero, controller 105 determines whether H is increasing, decreasing, or constant, respectively.

Step 204 follows step 202. At step 204, controller 105 determines whether the instant H is higher than a predetermined threshold concentration (TC). If not, then controller determines that there is no oxidant starvation at the cathode and there is excess oxygen at the cathode. Accordingly, at step 206, controller 105 decreases the oxidant stoichiometry, for example, by reducing the speed of motor 112 to decrease the oxidant stream mass flow rate supplied to fuel cell stack 100. Oxidant stoichiometry is thus advantageously controlled to reduce parasitic power consumption.

However, if at step 204, controller determines that the instant H is greater than TC, controller 105 advances to step 208 to determine whether dH is negative (that is, whether hydrogen concentration is decreasing). If controller 105 determines that dH/dt is negative, controller 105 preferably returns to step 202 without taking any positive action to counteract the detection of a hydrogen gas concentration greater than TC. However, at step 208, if controller 105 determines that dH/dt is not negative (that is, H is greater than TC and the hydrogen concentration is either constant or increasing), then, controller 105 advances to step 210 and determines whether the oxidant stream mass flow rate is greater than or equal to a desired maximum mass flow rate. If oxidant stream mass flow rate is not greater than or equal to the desired mass flow rate, then controller 105 proceeds to step 212 and increases the oxidant stoichiometry, preferably by a predetermined increment. Controller 105 then returns to step 202 to determine the effect of the increase in oxidant stoichiometry and to repeat the method.

At step 210, if controller 105 determines that the oxidant stream mass flow rate is already greater than or equal to a desired maximum mass flow rate, then controller 105 advances to step 214 and generates a warning signal and may eventually shut down fuel cell stack 100 (step 220). In the embodiment shown in FIG. 7, controller 105 may initiate additional steps 216 and 218 before proceeding to shut down fuel cell stack 100. Since the oxidant stream mass flow rate is already greater than or equal to the desired maximum, controller 105 proceeds to step 214 to generate a warning signal and then to step 216 to attempt a corrective action other than increasing the oxidant stream mass flow rate. One or more leaks within the fuel cell may be the cause for detecting an excessive amount of hydrogen gas in the cathode exhaust stream. For example, hydrogen could be leaking from the anode fluid passages to the cathode fluid passages, or a leak in the oxidant delivery subsystem could prevent a sufficient supply of oxygen from being directed to the cathode.

At step 216, controller 105 reduces the fuel pressure in fuel cell stack 100. If one or more leaks between the anode and the cathode are the cause for detecting hydrogen gas at the cathode, then reducing fuel pressure at the anode may reduce the rate of transfer of fuel from the anodes to the cathodes. Fuel pressure may be adjusted, for example by adjusting a pressure control valve or reducing the speed of a fuel compressor. Since the fuel stoichiometry may initially be greater than one, the reduction in fuel pressure may not have an immediate effect on electrical power output.

At step 218 controller 105 determines whether electrical power output is in fact less than electrical power demand. If electrical power output from fuel cell stack 100 is less than electrical power demand, then controller 105 proceeds to shut down fuel cell stack 100. If, however, electrical power output continues to match electrical power demand, then controller 105 returns step 202 and the fuel cell system continues to operate while the method is repeated. Meanwhile, the warning signal generated at step 214 alerts the operator that there is a problem that needs to be investigated to determine why H is greater than TC.

In FIG. 8, the method starts at step 230 and advances immediately to step 232 where sensor 104 begins to monitor the cathode exhaust stream to measure hydrogen gas concentration (H), and controller 105 calculates dH/dt. At step 234, controller 105 determines whether H is greater than threshold concentration (TC) or, at step 238, whether dH/dt is negative. The logic of steps 232, 234, 236, and 238 is substantially the same as the logic of corresponding steps shown in FIG. 7 (that is, 202, 204, 206, and 208, respectively). However, in the method of FIG. 8, if it is determined at step 238 that dH/dt is not negative, then controller 105 proceeds to step 240 and considers whether the fuel cell voltage is less than a predetermined voltage $V_o$. For example, in a preferred embodiment, voltage $V_o$ is assigned a value between zero and about 200 mV. The selected value for voltage $V_o$ is preferably greater than zero because localized oxidant starvation may produce hydrogen even though the overall cell voltage is still positive. For example, a hydrogen concentration of about 20 ppm may be measured in the cathode exhaust stream when fuel cell stack 100 has an average cell voltage of about 100 mV. Accordingly, if controller 105 determines that there is a combination of a positive dH/dt, and a cell voltage less than $V_o$, the cause of these two conditions may be oxidant starvation. However, if the cell voltage is greater than $V_o$, this is an indication that cell reversal is probably not the cause for detecting hydrogen gas in the cathode exhaust.

Therefore, if controller 105 determines at step 240 that cell voltage is not less than $V_o$, controller 105 determines that oxidant starvation is not likely the cause for H being greater than TC (that is, because oxidant starvation would be accompanied by a significantly reduced fuel cell voltage). More likely, the cause of H being greater than TC is one or more fluid leaks between the anode and cathode. Accordingly, controller 105 proceeds to step 246 and reduces the fuel pressure in fuel cell stack 100 to confirm that fluid leaks are indeed the reason for H being greater than TC. Steps 248 and 250 are essentially the same as steps 218 and 220 in the method of FIG. 7.

In order to better detect localized oxidant starvation conditions in fuel cell stack 100, the voltage of the individual fuel cells may be monitored. Alternatively, a more simplified cell voltage monitoring system may be employed to measure the cell voltage of selected fuel cells in a stack, or the average cell voltage of more than one fuel cell in a fuel cell stack. Accordingly, in the embodiments of FIGS. 8 and 9, the measured voltage $V_o$ may be an individual fuel cell voltage, an average voltage of a plurality of fuel cells, or the average voltage of all the fuel cells in fuel cell stack 100.

In the embodiment of FIG. 8, at step 240, if the fuel cell voltage is less than $V_o$, controller 105 proceeds to step 242 and checks whether the oxidant stream mass flow rate is already greater than or equal to the desired maximum. If yes, this is an indication that oxidant starvation is not likely the reason for H being greater than TC, and controller proceeds to step 246. Steps 246, 248 and 250 are similar to corresponding steps 216, 218, and 220 of FIG. 7. If the oxidant stream mass flow rate is less than the desired maximum, at step 244 controller 105 increases the oxidant stoichiometry, for example, by causing motor 112 to speed up so mechanical device 111 increases the oxidant stream mass flow rate to fuel cell stack 100.

The method illustrated by FIG. 9 has steps 260, 262, 264, 266, 268, 270, 272, and 274 in common with respective steps 230, 232, 234, 236, 238, 240, 242, and 244 of the method shown in FIG. 8. In FIG. 9, steps 276 and 278 are substituted for steps 246 and 248 in FIG. 8, and additional steps 280 and 284 are added following step 278. If at step 270, controller 105 determines that the fuel cell voltage is not less than $V_o$, controller 105 may proceed to step 276 to take further action to confirm that a leak is the likely source of the hydrogen gas in the cathode exhaust stream. At step 276, the pressure of the oxidant and fuel stream are adjusted to regulate the pressure differential between the oxidant and fuel stream fluid passages. For example, controller 105 may cause an increase in the pressure differential between the oxidant and fuel passages to determine whether this has a corresponding effect on H detected by sensor 104. If, at step 278, a corresponding effect is detected (that is, the adjustment of the pressure differential in step 276 influenced the hydrogen gas concentration in the cathode exhaust stream), then it is determined that a leak is the likely source of the hydrogen gas and controller 105 generates a warning signal at step 280. Then controller 105 selects whether to continue operating at a reduce power output (step 284) or to shut down the fuel cell (step 282) If controller 105 selects step 284, it may further regulate the oxidant and fuel pressures to balance the reactant pressures so that the pressure differential is approximately zero to thereby reduce the amount of hydrogen which is transferred from the fuel passages to the oxidant passages. The choice between step 282 and step 284 may be made based on the variance between the electrical power output and the electrical power demand. For example, if the electrical power output is more than a predetermined amount less than electrical power demand, step 282 is selected and fuel cell stack 100 is shut down.

Controller 105 may also proceed to step 276 from step 272, if the fuel cell voltage is less than $V_o$ and the oxidant mass flow rate is greater than or equal to a desired maximum.

Figure 10:
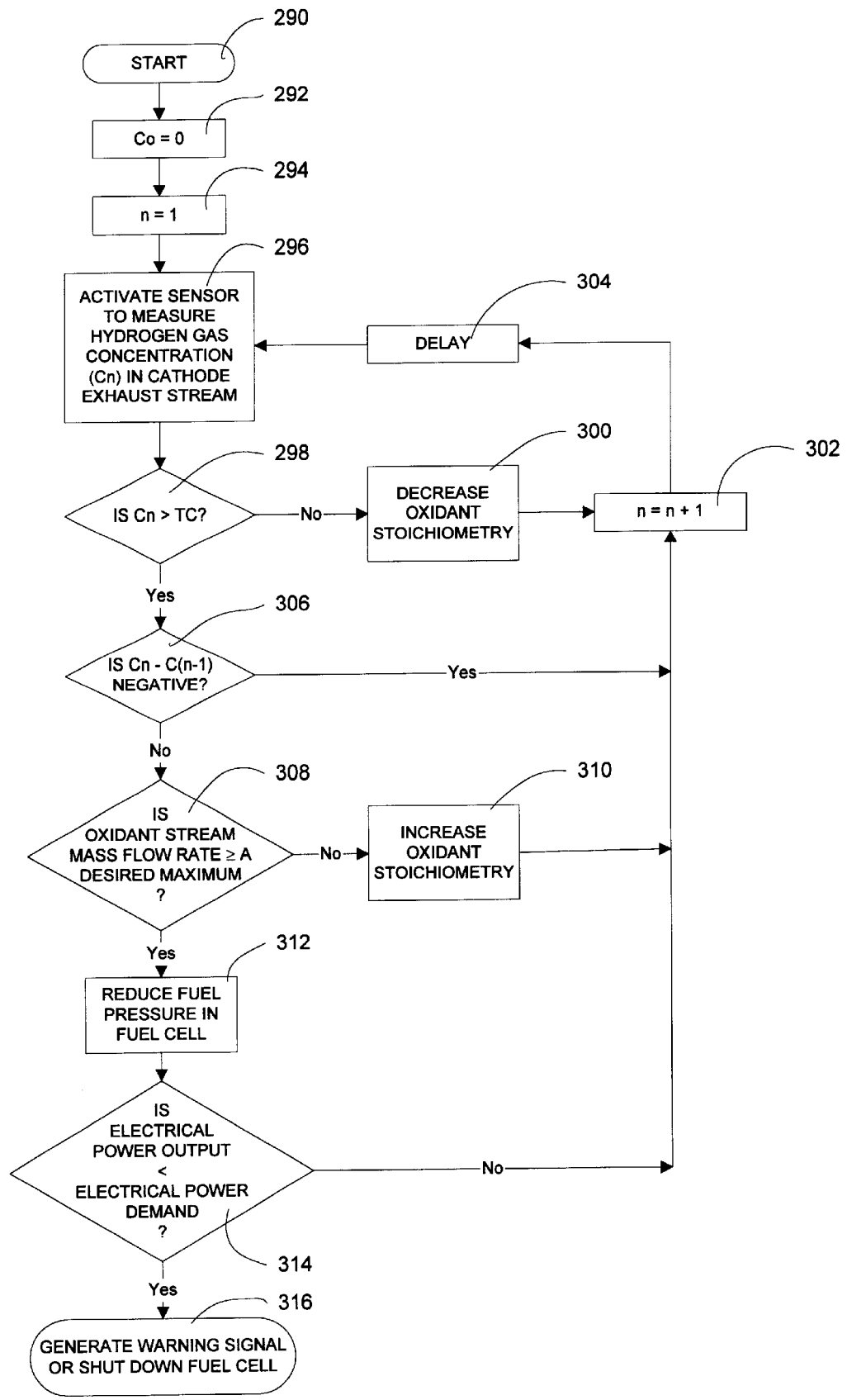
Figure 11:
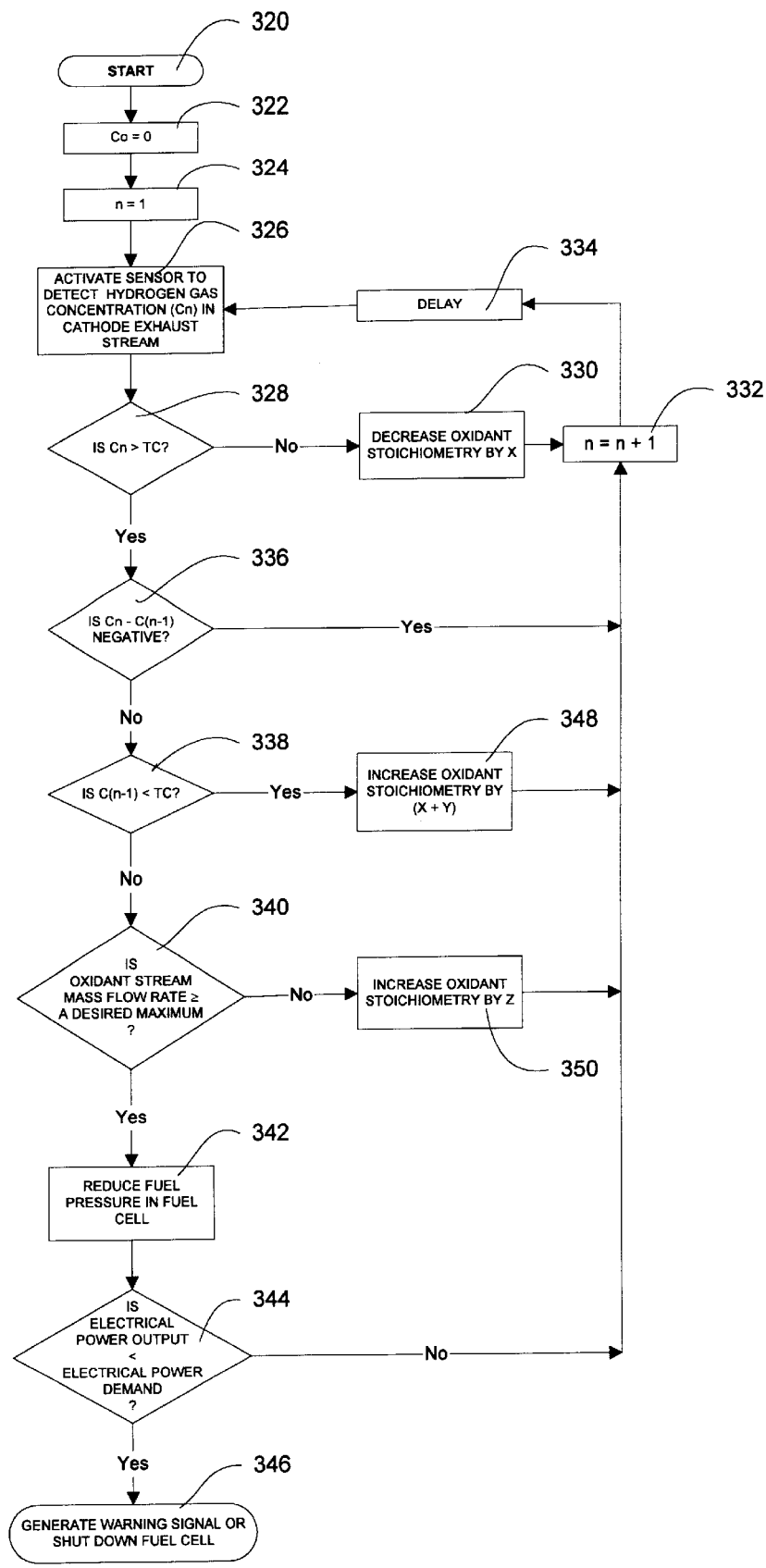

FIGS. 10 and 11 depict preferred embodiments of a method of controlling the oxidant stoichiometry wherein sensor 104 is periodically activated to detect the presence of hydrogen gas in the cathode exhaust stream. The delay between periodic activation of sensor 104 may vary depending upon several variables. A short delay may be employed for applications where the electrical power output is continually changing, for example where fuel cell stack 100 is supplying electrical power to a drive motor for a vehicle. In such applications, the delay may only be long enough to allow the effects of any corrective actions to be determined. A short delay is desired so that sensor 104 is activated with sufficient frequency to be responsive to changes in electrical power output. Longer delays may be employed by applications such as stationary power plants, which tend to operate to produce a more constant electrical power output.

With reference to FIG. 10, the control logic starts by activating controller 105 at step 290. At step 292, the initial value for the hydrogen gas concentration ($C_o$) is set to zero. At step 294 controller 105 sets counter number "n" to one. At step 296, controller 105 activates sensor 104 to detect the presence of hydrogen gas in a cathode exhaust stream. Sensor 104 emits an output signal that is representative of the hydrogen gas concentration ($C_n$). This output signal is sent to controller 105, which determines at step 298 whether $C_n$ is greater than the threshold concentration TC. If $C_n$ is not greater than TC, then it is assumed that there are no problems with leaks or oxidant starvation. To improve efficiency by reducing parasitic electrical loads, controller 105 proceeds to step 300 and decreases the oxidant stoichiometry by a predetermined amount (for example, a fixed increment or a percentage). Then at step 302, controller 105 increases the value of n by one before proceeding to step 304. At step 304 controller 105 waits for a predetermined delay period to elapse before returning to step 296 to re-activate sensor 104. Therefore, so long as there is no oxidant starvation, and no leaks or other sources of hydrogen gas in the cathode exhaust, controller 105 will continue to loop through steps 296, 298, 300, 302 and 304. In this way, the oxidant stoichiometry is reduced to about one or until $C_n$ is greater than TC. Decreasing oxidant stoichiometry in this manner reduces parasitic power consumption.

At step 298, when $C_n$ is greater than TC, controller 105 proceeds to step 306 and compares $C_n$ to the previously measured hydrogen gas concentration, $C_{(n-1)}$. If $C_n-C_{(n-1)}$ is negative, this indicates that the hydrogen gas concentration has decreased and controller 105 returns to step 296 via steps 302 and 304. As long as the hydrogen gas concentration is decreasing, controller 105 does not actively take any corrective action. At step 302, counter number n is increased by one. Step 304 is the delay step.

However, if at step 306, controller 105 determines that $C_n-C_{(n-1)}$ is positive, this indicates that the hydrogen gas concentration has increased from the previous measurement. This prompts controller 105 to take corrective action by proceeding to step 308. At step 308, controller 105 determines from the present oxidant stream mass flow rate whether or not the oxidant stream mass flow rate is greater than or equal to the desired maximum. If not, controller 105 proceeds to step 310 and increases the oxidant stoichiometry, for example, by causing motor 112 to speed up so mechanical device 111 increases the mass flow rate of the oxidant stream supplied to fuel cell stack 100. After step 310, controller 105 eventually loops back to step 296 after performing intermediate steps 302 (increasing counter number n by one) and 304 (the delay step). This corrective action presumes that the cause of the increased concentration of hydrogen gas in the cathode exhaust is oxidant starvation at the cathode.

However, if oxidant starvation is not the cause for the increasing hydrogen gas concentration in the cathode exhaust, the oxidant stream mass flow rate will soon be increased to the maximum mass flow rate. Then, at step 308, controller 105 will recognize that oxidant starvation is not the cause of the problem and controller 105 will proceed to step 312.

At step 312, controller 105 reduces the pressure in the fuel stream by a predetermined amount (for example, a fixed increment or a percentage). If the source of the hydrogen gas detected in the cathode exhaust is a leak in fuel cell stack 100, reducing the pressure in the fuel stream may have a corresponding effect on the leakage rate. Since the fuel stoichiometry may initially be greater than 1.0 (for example, a fuel stoichiometry of 1.5 or 2.0 is common), decreasing the fuel mass flow rate may not initially affect the electrical power output. At step 314, controller 105 checks whether the electrical power output is less than the electrical power demand. If the electrical power output is not less than the electrical power demand, controller 105 loops back to step 296 after performing intermediate steps 302 and 304. However, if the electrical power output is less than electrical power demand, this indicates that there is a problem with fuel cell stack 100 that prevents it from performing at this capacity. In this case, controller 105 proceeds to step 316 where controller 105 either generates a warning signal or causes fuel cell stack 100 to shut down.

With regard to steps 300, 310, and 312 of FIG. 10, the respective oxidant stoichiometry or fuel pressure may be increased and decreased by a predetermined fixed percentage or a fixed increment. For example, the fixed percentage change in oxidant stoichiometry or fuel pressure may be 1 or 2%.

With reference to FIG. 11, steps 320, 322, 324, 326, 328, 332, 334, 336, 340, 342, 344, and 346 are substantially the same as steps 290, 292, 294, 296, 298, 302, 304, 306, 308, 312, 314 and 316 of FIG. 10, respectively. However, in the method of FIG. 11, controller 105 attempts to maintain an oxidant stoichiometry that is a desired amount above 1.0 (that is, 1.0+Y). For example Y may be, for example, 0.05, 0.10, 0.20, or even about 0.50 (that is, about 50%). Preferably Y represents an increase of less than 50% to avoid excessive parasitic power consumption. In this way, a small surplus oxidant buffer is provided to reduce the occurrence of oxidant starvation conditions that might produce hydrogen gas in the cathode exhaust. The oxidant stoichiometry is still preferably much less than the oxidant stoichiometries used in conventionally operated fuel cells so there is still a substantial reduction in the parasitic electrical load caused by the operation of oxidant stream mechanical device 111.

In the embodiment of FIG. 11, after step 328, if controller 105 determines that the hydrogen gas concentration ($C_n$) is less than threshold concentration TC, then controller loops back to step 326 via steps 330, 332 (increasing counter number n by one), and 334 (the delay step). At step 330 controller 105 decreases the oxidant stoichiometry by a predetermined increment (X), where X may be, for example, about 0.1 or about 0.2. Accordingly, if, for example, X is 0.1 and oxidant stoichiometry is 1.4, at step 330 controller 105 would adjust oxidant stream mass flow rate to decrease oxidant stoichiometry to 1.3. Thus, while there is an excess of oxidant at the cathode, oxidant stream mass flow rate is reduced through the loop comprising steps 326, 328, 330, 332 and 334 until controller 105 determines at step 328 that $C_n$ is greater than TC, whereupon controller 105 proceeds to step 336.

Step 336 of FIG. 11 performs substantially the same function as step 306 of FIG. 10. That is, if the hydrogen gas concentration is decreasing (that is, $C_n-C_{(n-1)}$ is negative), then controller returns to step 326 via steps 332 and 334. Controller 105 continues to periodically monitor $C_n$ without taking any action to actively increase oxidant stoichiometry. However, if controller 105 determines at step 328 that $C_n$>TC, and at step 336, that the hydrogen gas concentration is constant or increasing (that is, $C_n-C_{(n-1)}$ is not negative), the controller 105 proceeds to step 338.

At step 338, if controller 105 determines that the previous measurement of the hydrogen gas concentration was less than TC, controller 105 increases the oxidant stream mass flow rate by (X+Y) at step 348. For example, when TC corresponds to an oxidant stoichiometry of about one, in the method of FIG. 11, at step 348 oxidant stoichiometry is controlled so that it is approximately 1.0+Y. That is, in the previous loop, hydrogen concentration $C_{(n-1)}$ was less than TC, but decreasing oxidant stoichiometry by X caused the hydrogen concentration in the next loop (that is, the present loop) to be higher than TC. Accordingly, in the previous loop, $C_{(n-1)}$ was close in value to TC, and since in this example, a measured hydrogen concentration of about TC corresponds to an oxidant stoichiometry of about one, increasing oxidant stoichiometry by (X+Y), results in an oxidant stoichiometry of about 1.0+Y.

If at step 338, controller 105 determines that the previously measured hydrogen gas concentration was greater than TC, controller 105 proceeds to step 340 to determine whether the oxidant stream mass flow rate is already greater than or equal to a desired maximum. If not, controller 105 proceeds to step 350 and increases the oxidant stoichiometry by Z. The value of Z is preferably greater than (X+Y) so that when $C_n$ is higher than TC for more than one loop, the oxidant stoichiometry is increased more rapidly.

However, if at step 340 controller 105 determines that oxidant stream mass flow rate is already greater than or equal to a desired maximum, controller 105 proceeds to step 342. Steps 342, 344 and 346 are substantially the same as respective steps 312, 314 and 316 in FIG. 10.

Figure 12:
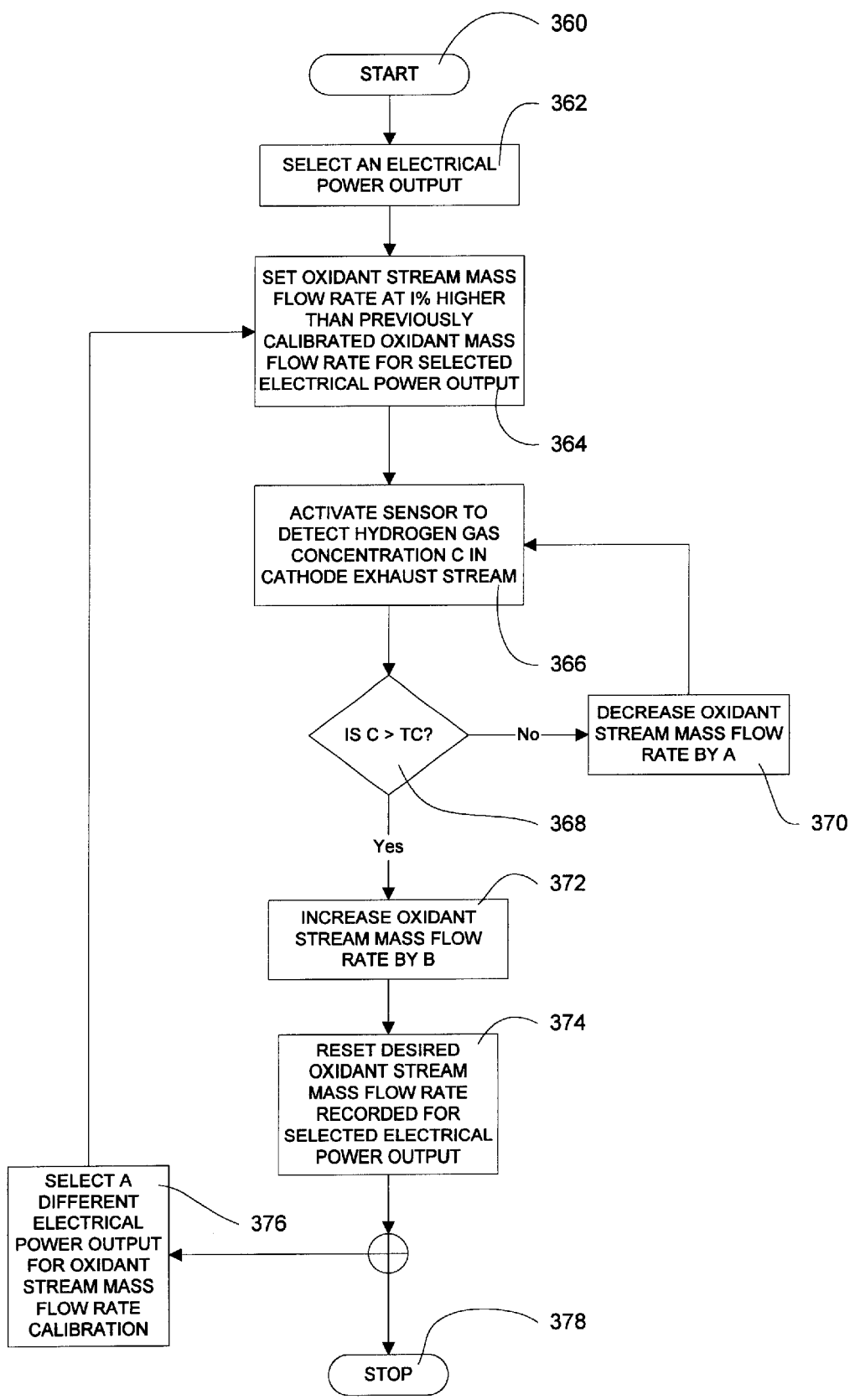

FIG. 12 depicts another preferred embodiment of a method of controlling the supply of oxidant to a fuel cell. In the method of FIG. 12 the preferred oxidant stream supply mass flow rate for a predetermined oxidant stoichiometry is calibrated for a range of specific electrical power outputs. During a calibration procedure, controller 105 determines the desired oxidant stream mass flow rates (for a particular oxidant stream composition) for selected electrical power outputs and stores the desired mass flow rates in a look-up table. When this method is employed, the electrical power demand determines the oxidant stream mass flow rate. That is, a controller monitors the electrical power demand and sets the oxidant mass flow rate with reference to a look-up table, which indicates the desired oxidant stream mass flow rate for selected electrical power demands. In this way, the oxidant stoichiometry is controlled to reduce the amount of excess oxidant supplied to fuel cell stack 100, thereby reducing parasitic electrical power consumption.

FIG. 12 depicts a calibration procedure for determining the oxidant stream mass flow rate for different selected electrical power outputs. When fuel cell stack 100 is actually operating, if the electrical power output is between selected loads in the look-up table, the desired oxidant stream mass flow rate may be determined by interpolating between selected electrical loads to determine the desired oxidant stream mass flow rate.

In an alternative embodiment, the calibration procedure may be used to calibrate the oxidant supply system directly.

For example, in a system that employs an oxidant compressor, the system is calibrated to control the speed of the compressor in response to selected electrical power demands. In this way, oxidant stream mass flow rate need not be measured and with each calibration, the calibration process will automatically compensate for any degradation in compressor performance over its operational lifetime.

The calibration procedure depicted in FIG. 12 may be executed periodically when fuel cell stack 100 is being serviced for regular maintenance. The procedure begins at step 360, by activating controller 105. In this embodiment, because calibration is typically done during maintenance periods, controller 105 and sensor 104 may be detachable from the fuel cell system. In this way, the same equipment may be used to calibrate a plurality of fuel cell stacks. A coupling may be provided so that a sensing element may be inserted into the fuel cell so that the sensing element is exposed to the cathode exhaust stream.

At step 362 an electrical power output is selected and fuel cell stack 100 is operated to produce that electrical power output. The selected electrical power output may be any electrical power output within the operating range of fuel cell stack 100. A plurality of electrical power outputs are typically selected during the calibration procedure so it is convenient to start with an electrical power output at the low end of the range; progressively higher electrical power outputs may be subsequently selected to complete the calibration procedure.

At step 364, controller 105 accesses a look-up table to determine the previously calibrated oxidant stream mass flow rate for the selected electrical power output. Controller 105 then sets the oxidant stream mass flow rate so that it is initially I % higher than the previously calibrated oxidant stream mass flow rate for the selected electrical power output. It is preferable to calibrate the oxidant stream mass flow rate by starting with a surplus oxidant stream mass flow rate rather than a shortage of oxidant, since this precaution avoids initiating the calibration procedure in an oxidant starvation mode.

At step 366 sensor 104 is activated to detect the presence of hydrogen gas in the cathode exhaust stream. If fuel cell stack 100 is initially supplied with a surplus of oxidant, at step 368, the hydrogen gas concentration C is expected to be less than a threshold concentration TC. If controller 105 determines that C is not greater than TC, controller 105 continues to decrease the oxidant stream mass flow rate by looping back to step 366 via step 370. With each loop through step 370, controller 105 decreases the oxidant stream mass flow rate by increment A. For example, the value of increment A may correspond to stoichiometry reductions, of say 0.05 or 0.1 so that oxidant stoichiometry is reduced by that amount each time step 370 is performed. Because the selected load is constant during the calibration procedure, changes in the oxidant stream mass flow rate result in corresponding changes in the oxidant stoichiometry. The accuracy of the calibration procedure may be increased by decreasing the value of A so that more calibration loops are performed using smaller incremental reductions in the oxidant stream mass flow rate.

When the oxidant stream mass flow rate is finally reduced so that hydrogen gas concentration C is greater than TC, controller 105 proceeds to step 372 and increases the oxidant stream mass flow rate by increment B. Next, at step 374, controller 105 resets the look-up table value so that the desired oxidant stream mass flow rate in the look-up table matches the current mass flow rate for the selected electrical power output. Finally, controller 105 may choose to stop the calibration procedure at step 378, or to select a different electrical power output for oxidant stream mass flow rate calibration at step 376. If step 376 is chosen, a different electrical power output is selected and controller 105 returns to step 364 where the calibration procedure begins again for the newly selected electrical power output.

The value of A and B may be the same or B may be higher than A. When B is higher than A, the look up table values will be calibrated so that there will be a surplus of oxidant supplied to the cathode. The greater the difference between the values for B and A, the greater will be the surplus. A surplus supply of oxidant helps to reduce the likelihood of causing oxidant starvation conditions that might produce hydrogen gas in the oxidant stream. When the power output is expected to be dynamic, a higher oxidant stoichiometry may be preferred to prevent oxidant starvation during transitional periods when electrical power output is changing. The value of B is preferably selected so that the oxidant stoichiometry is generally less than two and preferably between about one and about 1.5.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A method of operating a fuel cell, wherein said fuel cell has a cathode supplied with an oxidant stream and an anode supplied with a fuel stream, said method comprising:
    (a) monitoring a cathode exhaust stream downstream of said cathode to detect hydrogen gas concentration; and
    (b) decreasing oxidant stoichiometry when said hydrogen gas concentration is less than a first threshold concentration.

2. The method of claim 1 wherein said fuel cell is one of a plurality of fuel cells arranged in a fuel cell stack and said cathode exhaust stream is monitored downstream of a plurality of cathodes associated with said plurality of fuel cells.

3. The method of claim 1 further comprising increasing said oxidant stoichiometry when said hydrogen gas concentration is greater than a second threshold concentration.

4. The method of claim 3 wherein said first threshold concentration is the lower detection limit of a hydrogen sensor used to monitor said cathode exhaust stream.

5. The method of claim 3 wherein said second threshold concentration is about 20 ppm of hydrogen.

6. The method of claim 3 wherein said second threshold concentration is greater than said first threshold concentration.

7. The method of claim 3 wherein said oxidant stoichiometry is adjusted by adjusting the oxidant concentration in said oxidant stream supplied to said cathode.

8. The method of claim 3 wherein said oxidant stoichiometry is adjusted by adjusting the electrical power output of said fuel cell.

9. The method of claim 3 wherein said oxidant stoichiometry is adjusted by adjusting the mass flow rate of said oxidant stream supplied to said cathode.

10. The method of claim 9 wherein said oxidant stream mass flow rate is adjusted by adjusting the speed of a mechanical device which supplies said oxidant stream to said cathode.

11. The method of claim 9 wherein said oxidant stream mass flow rate is adjusted by a fixed amount or by a fixed percentage of the instantaneous oxidant stream mass flow rate.

12. The method of claim 9 wherein said oxidant stoichiometry is adjusted by adjusting said oxidant stream mass flow rate by an amount that is dependent upon the magnitude of the detected hydrogen gas concentration.

13. The method of claim 1 further comprising steps for reducing said hydrogen gas concentration within said cathode exhaust stream when said hydrogen gas concentration is greater than a second threshold concentration, wherein said steps comprise comparing said oxidant stream mass flow rate to a maximum desired mass flow rate, and
   (a) if said oxidant stream mass flow rate is less than said maximum desired mass flow rate, increasing said oxidant mass flow rate; and
   (b) if said oxidant mass flow rate is greater than or equal to said maximum desired mass flow rate, ceasing operation of said fuel cell if said hydrogen gas concentration is greater than a third concentration threshold which is greater than said first and second concentration thresholds; and
generating a warning signal and continuing to operate said fuel cell if said hydrogen gas concentration is less than said third concentration threshold.

14. The method of claim 3 wherein said method further comprises taking no steps to change said oxidant stoichiometry when said hydrogen gas concentration is between said first and second threshold concentrations.

15. The method of claim 9 further comprising, after increasing said oxidant mass flow rate, comparing said oxidant mass flow rate to a desired oxidant mass flow rate for the instantaneous fuel cell electrical power output, and generating a warning signal or ceasing operation of said fuel cell if said oxidant mass flow rate is more than a predetermined amount greater than said desired oxidant mass flow rate.

16. The method of claim 13 wherein said desired oxidant mass flow rate is determined from a look-up table.

17. The method of claim 1 wherein said monitoring comprises continuously monitoring said cathode exhaust stream for said hydrogen gas concentration and determining whether said hydrogen gas concentration is increasing or decreasing, and when said hydrogen gas concentration is greater than a second threshold concentration, said method further comprises:
   maintaining a substantially constant oxidant stoichiometry when said hydrogen concentration is decreasing; and
   increasing said oxidant stoichiometry when said hydrogen concentration is increasing.

18. The method of claim 17 further comprising:
   generating a warning signal if said hydrogen gas concentration is greater than said first threshold concentration, said hydrogen gas concentration within said cathode exhaust stream is increasing, and said oxidant stream is flowing at a maximum desired mass flow rate.

19. The method of claim 18 further comprising controlling said fuel stream to decrease fuel stream pressure when said warning signal is generated.

20. The method of claim 19 further comprising monitoring electrical power output of said fuel cell, and continuing to operate said fuel cell if said electrical power output is not less than electrical power demand, and ceasing operation of said fuel cell if said electrical power output is a predetermined amount less than said electrical power demand.

21. The method of claim 19 further comprising checking electrical power output and,
   continuing to operate said fuel cell if said electrical power output is not less than electrical power demand, and
   generating a warning signal if said electrical power output is less than said electrical power demand and then selecting between operating at a reduced electrical power output and ceasing operation of said fuel cell.

22. The method of claim 1 wherein said monitoring comprises continuously monitoring said cathode exhaust stream for said hydrogen gas concentration and determining whether said hydrogen gas concentration is increasing or decreasing, and when said hydrogen gas concentration is greater than a second threshold concentration, said method further comprises:
   maintaining a constant oxidant stoichiometry when said hydrogen concentration is decreasing; and
   measuring fuel cell voltage and comparing said fuel cell voltage to a voltage threshold value, and
      if said fuel cell voltage exceeds said voltage threshold value and said hydrogen gas concentration is increasing, decreasing the pressure of said fuel stream;
      if said fuel cell voltage is less than said voltage threshold value, said hydrogen gas concentration is increasing, and oxidant mass flow rate is less than a desired maximum, then increasing said oxidant stoichiometry; and
      if said fuel cell voltage is less than said voltage threshold value, said hydrogen gas concentration is increasing, and oxidant mass flow rate is greater than or equal to a desired maximum, then decreasing the pressure of said fuel stream.

23. The method of claim 22 further comprising regulating fluid pressure of said oxidant and fuel streams to increase a pressure differential between said oxidant and fuel streams.

24. The method of claim 22 further comprising regulating fluid pressure of said oxidant and fuel streams to reduce a pressure differential between said oxidant and fuel streams.

25. The method of claim 22 wherein said voltage threshold value is about 100 millivolts.

26. The method of claim 22 further comprising ceasing operation of said fuel cell when electrical power output is less than electrical power demand.

27. The method of claim 1 wherein said monitoring is performed periodically.

28. The method of claim 9 wherein said oxidant stream mass flow rate is reduced until said second predetermined threshold concentration of said hydrogen gas is detected and then increasing said oxidant mass flow rate by a predetermined percentage so that said oxidant stoichiometry is a predetermined percentage higher than about one.

29. The method of claim 28 wherein said predetermined percentage is less than 50%.

* * * * *